United States Patent
Voeller

(10) Patent No.: US 7,328,124 B2
(45) Date of Patent: Feb. 5, 2008

(54) APPARATUS AND METHOD FOR MEASURING AND COMPENSATING STEERING-ANGLE SENSITIVE ALIGNMENT MEASUREMENTS

(75) Inventor: David A. Voeller, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 11/245,836

(22) Filed: Oct. 7, 2005

(65) Prior Publication Data
US 2006/0080015 A1 Apr. 13, 2006

Related U.S. Application Data

(60) Provisional application No. 60/617,155, filed on Oct. 7, 2004, now abandoned.

(51) Int. Cl.
*G06F 19/00* (2006.01)
*G06F 17/30* (2006.01)
*G06F 17/10* (2006.01)

(52) U.S. Cl. .......................... 702/151; 33/608; 33/645; 280/86.75; 356/155; 700/279; 702/34; 702/127

(58) Field of Classification Search ................ 33/600, 33/608, 609, 645; 280/86.75; 356/139.09, 356/155; 700/279; 702/33, 34, 127, 151
See application file for complete search history.

(56) References Cited

U.S. PATENT DOCUMENTS

| | | | | |
|---|---|---|---|---|
| 3,187,440 | A | * | 6/1965 | Merrill et al. ............ 33/203.13 |
| 4,130,362 | A | * | 12/1978 | Lill et al. ............... 356/139.09 |
| 4,143,970 | A | * | 3/1979 | Lill ............................ 356/155 |
| 4,319,838 | A | | 3/1982 | Grossman et al. |
| 4,574,490 | A | * | 3/1986 | Curchod .................. 33/203.18 |
| 5,014,227 | A | | 5/1991 | Kling et al. |
| 5,165,177 | A | * | 11/1992 | Kercheck ................. 33/203.18 |
| 5,257,458 | A | * | 11/1993 | Koerner ................... 33/203.12 |
| 5,488,472 | A | | 1/1996 | January |
| 5,513,439 | A | | 5/1996 | Brauer et al. |
| 5,553,389 | A | | 9/1996 | Winslow et al. |
| 5,832,617 | A | | 11/1998 | Gill |
| 5,919,238 | A | * | 7/1999 | Lavey ......................... 701/29 |
| 6,219,134 | B1 | * | 4/2001 | Voeller et al. ......... 356/139.09 |
| 6,560,883 | B2 | | 5/2003 | Jackson et al. |
| 6,634,109 | B1 | | 10/2003 | Dale, Jr. et al. |
| 6,658,751 | B2 | | 12/2003 | Jackson et al. |
| 6,691,062 | B1 | | 2/2004 | Nobis |
| 6,728,609 | B2 | | 4/2004 | Murray et al. |
| 6,796,043 | B2 | | 9/2004 | Jackson et al. |

OTHER PUBLICATIONS

Pamphlet—SAE—The Engineering Resource For Advancing Mobility—SAE Technical Paper Series—Steering Geometry and Caster Measurement/ Daniel B. January/Hunter Engineering Co.—Feb. 25-Mar. 1, 1985—12 pages.

* cited by examiner

*Primary Examiner*—Edward R Cosimano
(74) *Attorney, Agent, or Firm*—Polster, Lieder, Woodruff & Lucchesi, L.C.

(57) ABSTRACT

A method for measuring and compensating steered-angle sensitive wheel alignment angle and distance measurements for the effects of steering a wheel from a straight ahead position, thereby enabling an operator to carry out a vehicle wheel alignment angle adjustment without having to maintain a wheel in a straight-ahead steered condition during an alignment angle or distance adjustment, or to require the operator to continually return the wheel to the straight-ahead steered condition to acquire updated measurements of an alignment angle or distance currently being adjusted.

16 Claims, 9 Drawing Sheets

FIGURE 18
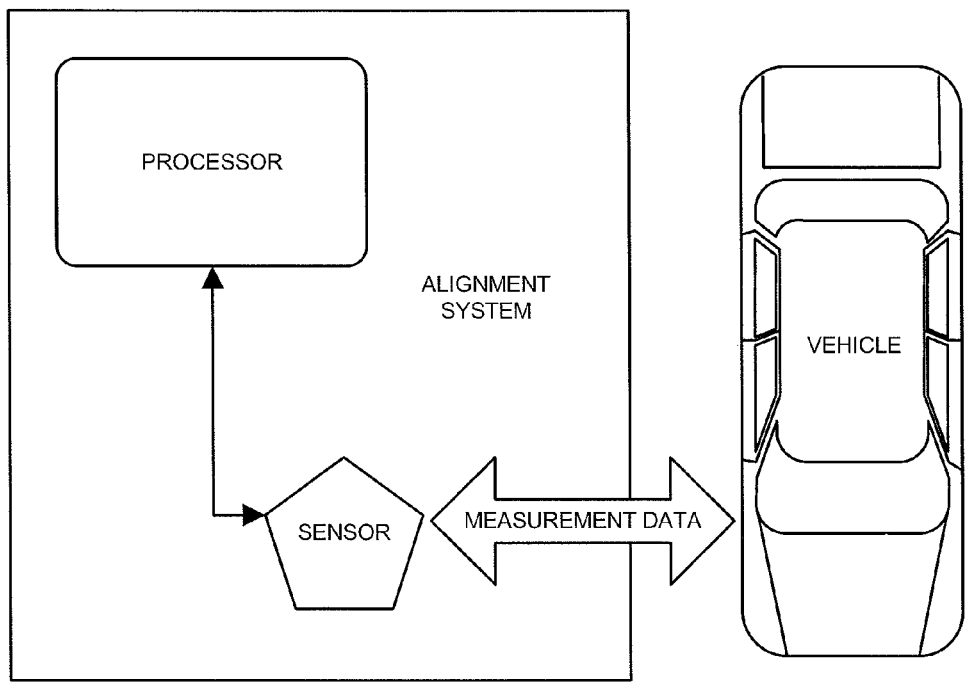
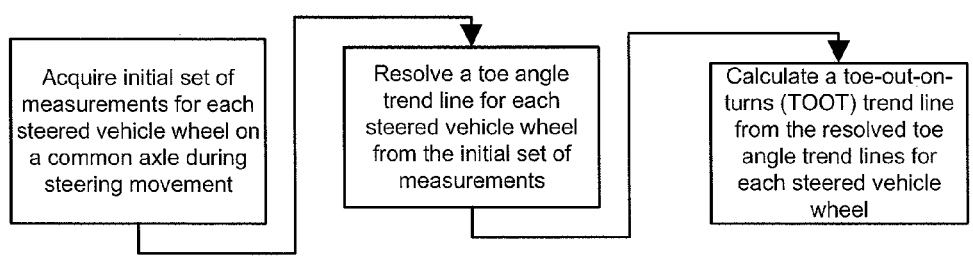
FIGURE 19

APPARATUS AND METHOD FOR MEASURING AND COMPENSATING STEERING-ANGLE SENSITIVE ALIGNMENT MEASUREMENTS

CROSS-REFERENCE TO RELATED APPLICATIONS

The present application is related to, and claims priority from, U.S. Provisional Patent Application Ser. No. 60/617,155 filed on Oct. 7, 2004, now expired, which is herein incorporated by reference.

STATEMENT REGARDING FEDERALLY SPONSORED RESEARCH

Not Applicable.

BACKGROUND OF THE INVENTION

The present invention relates generally to vehicle wheel alignment measurement procedures, and in particular, to a method for measuring and compensating steering-angle sensitive wheel alignment angle and distance measurements for the effects of altering a vehicle wheel steering-angle or distance during a vehicle wheel alignment adjustment procedure.

During a vehicle wheel alignment process, the operator is occasionally required to carry out steered-wheel alignment angle adjustments for wheel alignment angles measured with the vehicle steered in the straight-ahead direction. For example, measured camber and caster angles vary in relationship to the current steering-angle (toe angle) measurement. To further complicate matters, the caster angle of a steerable wheel is difficult to measure. Caster is defined as an angle between a vertical axis and a projection of an invisible steering axis onto a vertical plane containing the thrust line of the vehicle. Hence, a representative measurement, referred to as "live caster" $K_{Live}$ is either acquired from a caster transducer on a locked wheel alignment angle sensor secured to a steered vehicle wheel, or from the caster value for a fixed position of a wheel alignment measurement system optical target secured to a steered vehicle wheel after a measured caster angle (K) for the wheel has been calculated from measurements taken by alignment sensors.

The measurements required to calculate the measured caster angle are obtained during a caster steer procedure, and are based on either changes in the camber angle of the wheel or, for machine-vision based alignment systems utilizing the Schur method of calculating caster, on a minimum of 2 different images of the wheel or target as the toe angle of the wheel changes. Specification values for camber and caster angles are typically defined only for a specific steering-angle (toe angle), such as 0° toe, or with the steering-angle (toe angle) aligned relative to the vehicle thrust line.

Often it is difficult or awkward for the operator to maintain the vehicle steering in a specified location and access the various suspension components and adjustment points required to complete the necessary alterations. Additionally, during a vehicle wheel alignment adjustment procedure, any steering angle changes are typically made by turning the vehicle steering wheel from the driver's seat position, and not by turning the vehicle wheels directly, resulting in lost time to complete the alignment adjustment procedure, additional physical effort, and an inconvenience to the alignment technician who is required to climb in and out of the vehicle.

For some wheel alignment angle adjustments, the operator is required to initially steer the vehicle wheels to a straight ahead position, or to another selected position, from the driver's seat, make the necessary adjustments causing the steered location of the vehicle wheels to change, and then return to the driver's seat to steer the wheels back to the selected position to continue making adjustments of the alignment angles. This time consuming process is repeated several times until the adjustments of the alignment angles results in the alignment angles being within specification while the vehicle is steered to the selected position.

Furthermore, when the operator turns the steered wheel from the straight-ahead or selected position, the measured value for the steering-angle sensitive alignment angle, such as camber or live caster, will change in relationship to the steered angle of the vehicle wheel. If the operator attempts to adjust the steering-angle sensitive alignment angle with the wheel steered away from the straight ahead or selected position, using the measured value associated with the straight-ahead or selected steered position, the resulting adjustment will be incorrect when the wheel is returned to the straight-ahead or selected steered position.

Accordingly, it would be advantageous to provide a method for compensating steered-angle sensitive wheel alignment angle measurements for the effects of steering a wheel away from a straight ahead or selected measurement position, thereby enabling an operator to carry out a vehicle wheel alignment angle adjustment without having to maintain a wheel in a straight-ahead or other selected steered condition during an alignment angle adjustment, or requiring the operator to continually return the wheel to the straight-ahead or selected position to acquire updated measurements of an alignment angle during the adjustment thereof.

Furthermore, when the operator turns the steered wheel to a straight-ahead position relative to a vehicle thrust-line, there may be some measurements such as the levelness of the sensors which may not match a previous value of the same measurement within a given tolerance because the previous value was acquired when the steered wheel was aligned relative to the vehicle's center-line.

Accordingly, it would be advantageous to provide a method for compensating steered-angle vehicle measurements acquired at a non-optimal steering angle for deviations associated with the non-optimal steering angle. Doing so allows an operator to perform fewer steps during a vehicle measurement or adjustment procedure.

Furthermore, when the operator turns the steered wheel from the straight-ahead or selected position, a measured value for a steering-angle sensitive alignment distance, such as setback or wheelbase on the vehicle's left and right side, will change in relationship to the steered angle of the vehicle wheel. If the operator attempts to adjust or measure the steering-angle sensitive alignment distance with the wheel steered away from the straight ahead or a selected position, the results are likely to be incorrect.

Accordingly, it would be advantageous to provide a method for compensating steered-angle sensitive wheel alignment distance measurements for the effects of steering a wheel from a straight ahead or selected measurement position. This would enable an operator to carry out a vehicle wheel alignment distance adjustment or measurement without having to maintain a wheel in a straight-ahead or other selected steered condition. The operator would no longer be required to continually return the wheel to the straight-ahead or selected position to acquire updated measurements of an alignment distance currently being adjusted.

During vehicle wheel alignment procedures, it is often necessary for an operator to "lock" the vehicle brakes to ensure that the wheels of the vehicle do not roll during an alignment angle adjustment or measurement procedure. For example, it is particularly important that the steered wheels of a vehicle be prevented from rolling movement during a procedure where the steering axis inclination angle measurement is calculated which requires steering the vehicle wheels from one side to another.

One method commonly utilized to confirm an operator has "locked" the vehicle brakes when carrying out a procedure where the wheels are steered involves comparing a measurement of the live caster angle obtained when the steered vehicle wheel is in the straight-ahead position with measurements of the live caster angle obtained when the steered vehicle wheel is turned either to the left or right by a predetermined amount. If the compared measurements differ by more than a predetermined value, the vehicle brakes are assumed to be "locked". While this method works for most vehicles, it is well known that different vehicle makes and models have different live caster angle difference thresholds from the straight-ahead position to a turned position, and accordingly, the predetermined value utilized for one vehicle may not be applicable to another vehicle.

Accordingly, it would be advantageous to provide a method for adapting a live caster angle difference threshold for each different vehicle to detect if the vehicle brakes are in a "locked" configuration, and to provide a method for detecting if the vehicle brakes are in a "locked" configuration which does not rely on comparison with a database of predetermined or fixed values.

During vehicle wheel alignment procedures, it is occasionally necessary for an operator to steer the vehicle wheels in order to access a suspension component or an alignment angle adjustment location such as a tie rod for adjusting toe angle. However, alignment angle measurements such as toe angle measurements are typically specified with the vehicle wheels steered straight ahead relative to a thrust line of the vehicle. Alternatively, alignment angle measurements such as setback angle are typically specified with the vehicle wheels steered straight ahead relative to a center line of the vehicle. Steering of the wheels to access the alignment angle adjustment location or suspension component alters the steering wheel angle from a centered position in which the front vehicle wheels are steered straight ahead relative to the thrust line or center line.

Accordingly, it would be advantageous to provide a method for determining the toe angle value for a steered wheel at a preferred steering orientation, such as steered-ahead relative to the vehicle thrust line, independent of the current steered wheel steering orientation to improve alignment angle adjustment procedures.

During a caster angle measurement procedure it is conventional for a steered wheel of the vehicle to be steered to either the left or right at 10° +/− a predetermined tolerance, or at 20° +/− a predetermined tolerance. Caster angle measurements acquired with the wheel steered short of, or beyond, the 10° or 20° target positions may not correspond with the predetermined caster angle specification values established for the 10° or 20° target positions due to the effect of the steering-angle.

Accordingly, it would be advantageous to provide a method for compensating measured caster angle values for the effect of steering-angle deviations, such that meaningful comparisons with predetermined caster angle specification values established for the 10° or 20° target positions may be made.

During a caster angle measurement procedure it is conventional for a steered wheel of the vehicle to be steered to either the left or right to a predetermined steering-angle. As the steered wheel of the vehicle is steered, the ride height of the vehicle changes. Some OEM alignment specifications are associated with a particular ride height at a predetermined steering-angle before being valid.

Accordingly, it would be advantageous to know how the ride height changes as the vehicle is steered such that meaningful comparisons can be made in alignment angles at all steering-angle deviations.

BRIEF SUMMARY OF THE INVENTION

Briefly stated, the present invention provides an apparatus and method for compensating steered-angle sensitive wheel alignment angle and distance measurements for the effects of steering a wheel from a preferred location such as the straight ahead position, thereby enabling an operator to carry out a vehicle wheel alignment angle or distance adjustment without having to maintain a wheel at the preferred location, or to require the operator to continually return the vehicle wheel to the preferred location to acquire updated measurements of an alignment angle or distance currently being adjusted.

In a method of the present invention, an initial set of wheel alignment angle measurements are acquired by a vehicle wheel alignment system for a steered vehicle wheel over a range of steering-angles. The initial set of wheel alignment angle measurements includes at least one measure of the steering-angle sensitive alignment angle at an associated predetermined steering-angle such as steer-ahead or 0° toe angle, together with a sufficient number of measurements of the steering-angle sensitive alignment angle at different steering-angles to resolve a trend line calculation representative of the steering-angle sensitive alignment angle over a range of steering-angles. Using the acquired initial measurements, the steering-angle sensitive alignment angle is calculated by the wheel alignment system for any given steering-angle of the steered vehicle wheel using the resolved trend line equation, and a comparison is made with the value of the steering-angle sensitive alignment angle at the predetermined steering-angle to determine a variation there from.

In an alternate method of the present invention, an initial set of wheel alignment angle and distance measurements are acquired by a vehicle wheel alignment system for a steered vehicle wheel over a range of steering-angles. The initial set of wheel alignment angle and distance measurements includes at least one measure of a steering-angle sensitive alignment distance at an associated predetermined steering-angle, such as steer-ahead relative to geometric centerline, and a sufficient number of measurements of the steering-angle sensitive alignment distance at different steering-angles to resolve a trend line calculation representative of the steering-angle sensitive alignment distance over a range of steering-angles. Using the acquired initial measurements, the steering-angle sensitive alignment distance is calculated by the wheel alignment system for any given steering-angle of the steered vehicle wheel using the resolved trend line equation, and a comparison is made with the value of the steering-angle sensitive alignment distance at the predetermined steering-angle to determine a variation there from.

In an alternate method of the present invention, an initial set of wheel alignment angle measurements are acquired by a wheel alignment system for a steered vehicle wheel. The initial set of wheel alignment angle measurements for the steered wheel includes at least one measure of a camber angle at a predetermined steering position, a measure of the camber alignment angle at a 0° toe angle position, a measure of a (calculated) caster angle, and a measure of a (calculated) steering axis inclination angle. Using the initial set of wheel alignment angle measurements, a variation in the camber angle associated with a steering position of the steered vehicle wheel is calculated by the wheel alignment system for any given steering position of the steered vehicle wheel using a predetermined equation associated with the camber alignment angle.

In an alternate method of the present invention, an initial set of wheel alignment angle measurements is acquired by a wheel alignment system for a steered vehicle wheel. The initial set of wheel alignment angle measurements for the steered wheel includes at least one measure of a live caster angle at a predetermined steering position, a measure of the live caster alignment angle at a 0° toe angle position, a measure of a (calculated) caster angle, and a measure of a (calculated) steering axis inclination angle. Using the initial set of measurements, a variation in the live caster angle associated with a steering position of the steered vehicle wheel is calculated by the wheel alignment system for any given steering position of the steered vehicle wheel using a predetermined equation associated with the live caster angle.

An alternate method of the present invention determines if a vehicle's brakes are in a "locked" condition during a vehicle wheel alignment angle measurement procedure. Live caster angle measurements and toe angle measurements are acquired by a wheel alignment system for a steered vehicle wheel as the wheel is steered about an arc. Each measurement value is compared to a corresponding value obtained from the live caster angle versus toe angle curve calculated by the wheel alignment system. If the measured value varies from the corresponding calculated value at an associated steered angle by more than a threshold amount, representative of a rolling movement in the wheel, an indication is provided that the vehicle brakes are in an "unlocked" condition.

An alternate method of the present invention determines if vehicle brakes are in a "locked" condition during a vehicle wheel alignment angle measurement procedure. Live caster angle measurements and toe angle measurements are acquired by a wheel alignment system for a steered vehicle wheel as the wheel is steered about an arc. A representative value, such as a coefficient of determination or a correlation coefficient, is calculated by the wheel alignment system using the measured values to determine if the vehicle brakes are locked. If the representative value exceeds a threshold amount, representative of rolling movement in the wheel, an indication that the vehicle brakes are in an "unlocked" condition is provided.

In an alternate method of the present invention, an initial set of wheel alignment angle measurements are acquired by a wheel alignment system for a steered vehicle wheel. The initial set of wheel alignment angle measurements includes a sufficient number of measurements of toe angles for the left and right steerable wheels about a steering arc to resolve a trend line calculation. Using the resolved toe trend line calculation, a Toe Out On Turns (TOOT) value for a first steered wheel is plotted against the toe angle of the opposite steered wheel, and represented by a trend line from which the measured toe angle of a steered wheel is compensated for steering-angle deviations during a toe angle adjustment.

In an alternate method of the present invention, an initial set of wheel alignment angle measurements are acquired by a wheel alignment system for a steered vehicle wheel. The initial set of wheel alignment angle measurements includes a sufficient number of measurements of toe angles, camber angles, and live caster angles for the left and right steerable wheels about a steering arc to resolve trend line calculations for camber angle as the toe angle changes and live caster angle as the toe angle changes. Using the resolved trend line calculations, a calculation of caster angle (K) for various toe angles can be presented to the alignment technician. Also, the resolved trend line calculations can be used to present to the alignment technician the calculated steering axis inclination angle for various toe angles.

In an alternate method of the present invention, a measurement of a change in a steered vehicle wheel steering-angle (toe angle) is compared by a wheel alignment system with a corresponding measurement of change in the rotational position of the vehicle steering wheel to identify a steering ratio for a vehicle steering system. The identified steering ratio is compared with predetermined specification values to verify proper operation of the vehicle steering system components, particularly in vehicle steering systems having variable or user-selectable steering ratios.

In an alternate method of the present invention, a hysteresis measurement of camber angle and live caster angle at a known steer angle such as 0° steer angle (toe angle) is measured. The hysteresis measurement is compared to a predetermined threshold. If the hysteresis value is greater than the predetermined threshold then the alignment system indicates that parts of the suspension and steering system are worn.

In an alternate method of the present invention, an initial set of wheel alignment angle measurements and distances are acquired by a vehicle wheel alignment system for a steered vehicle wheel over a range of steering-angles. The initial set of wheel alignment angle measurements and distances include at least one measure of the steering-angle sensitive alignment ride height distance at a first steering-angle for the steering-angle sensitive alignment distance such as steer-ahead or 0° toe angle, and a sufficient number of measurements of the steering-angle sensitive alignment ride height distance at different steering-angles to resolve a trend line calculation representative of the steering-angle sensitive alignment ride height distance over a range of steering-angles. Using the acquired initial measurements, the steering-angle sensitive alignment ride height distance is calculated by the wheel alignment system for any given steering-angle of the steered vehicle wheel using the resolved trend line equation, and a comparison is made with the value of the steering-angle sensitive alignment ride height distance at a specified steering-angle. A plot of the alignment ride height distance relative to the steering-angle may be displayed.

In an alternate method of the present invention, an alignment display of alignment distances relative to steering-angle includes a live location marker. The location marker changes location and associated values on the alignment display as the steering-angle is changed.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 18 is an illustration of vehicle wheel alignment system components; and

FIG. 19 is a flow chart illustrating steps in a third alternate method of the present invention.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The present invention provides a method for compensating steered-angle sensitive wheel alignment angle measurements for the effects of steering a steered wheel away from a preferred steering position such as the straight-ahead or 0° toe angle, thereby enabling an operator to carry out a vehicle wheel alignment angle measurement or adjustment without having to maintain the steered wheel in the preferred steering position during the alignment angle measurement or adjustment, or to require the operator to continually return the steered wheel to the preferred steering position to acquire updated measurements of an alignment angle undergoing adjustment after each alteration.

The present invention also provides a method for compensating steered-angle sensitive wheel alignment distance measurements for the effects of steering a steered wheel away from a preferred steering position such as the straight-ahead relative to geometric centerline, thereby enabling an operator to carry out a vehicle wheel alignment angle measurement or adjustment without having to maintain the steered wheel in the preferred steering position during the alignment angle measurement or adjustment, or to require the operator to continually return the steered wheel to the preferred steering position to acquire updated measurements of an alignment distance undergoing adjustment after each alteration.

Figure 15:
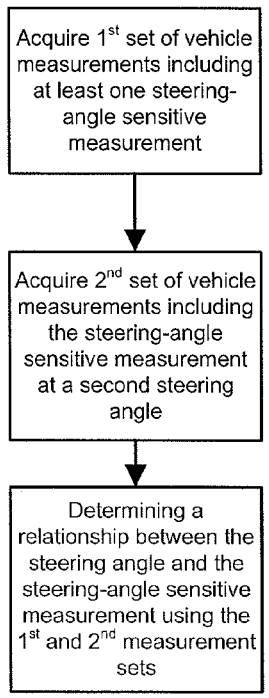
FIG. 15 is a flow chart illustrating steps in a method of the present invention.

In a method of the present invention, as shown in FIG. 15, an initial set of wheel alignment angle measurements are acquired for a steered vehicle wheel. The initial set of wheel alignment angle measurements include at least a measure of the steering-angle sensitive alignment angle at a first measurement position, such as the straight-ahead or 0° toe angle, and measures of the steering-angle sensitive alignment angle at a sufficient number of different steering positions (toe angles) of the steered wheel to resolve a trend line calculation (regression analysis) representative of the relationship between the steering-angle sensitive alignment angle and the steering position of the steered wheel.

Figure 16:
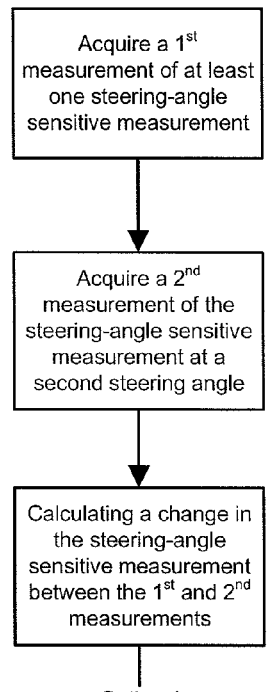
FIG. 16 is a flow chart illustrating steps in an alternate method of the present invention.

As shown in FIG. 16, using the initial set of measurements and the resolved trend line, an amount of change in the steering-angle sensitive alignment angle from the first steered location may be calculated for any given steering position (toe angle) of the steered vehicle wheel. One example of a trend line calculation suitable for use with the methods of the present invention is an nth order polynomial equation of the type:

$$Y = C_1 + C_2 X + C_n X^{n-1} \qquad \text{Eqn. (1)}$$

where X represents the steering-angle (toe angle), and Y represents the steering-angle sensitive alignment angle. The constants $C_n$ are preferably determined using conventional linear algebra techniques, such as a Gauss-Jordan elimination with no pivoting. However, those of ordinary skill in the art will recognize that the unknown constants $C_n$ may be determined using any of a variety of known techniques.

Similarly, other known trend line calculations such as a moving average or a linear line slope equation (y=mx+b) where 'm' is the slope of the trend line and 'b' is the y-intercept of the line, may be utilized in place of Equation (1) as is most appropriate for the particular data being represented.

The trend line representation preferably takes the form of an algorithm where given a value of X (toe angle), a corresponding value of Y is determined. The trend line could also be represented in the form of a look up table (LUT). Using a LUT would require the X value to be interpolated as well as the corresponding Y value.

In an alternate method of the present invention, an initial set of wheel alignment angle and distance measurements are acquired for a steered vehicle wheel. The initial set of wheel alignment angle and distance measurements include at least a measure of the steering-angle sensitive alignment distance at the preferred measurement position, such as straight-ahead relative to geometric centerline, and measures of the steering-angle sensitive alignment distance at a sufficient number of different steering positions (toe angles) of the steered wheel or wheels to resolve a trend line calculation (such as a regression analysis) representative of the relationship between the steering-angle sensitive alignment distance and the steering position of the steered wheel.

In an alternate method of the present invention, an initial set of wheel alignment angle and distance measurements are acquired for a steered vehicle wheel. The initial set of wheel alignment angle and distance measurements include at least a measure of the steering-angle sensitive alignment distance at a known location, such as straight-ahead relative to thrust angle, a measure of thrust angle, and measures of the steering-angle sensitive alignment distance at a sufficient number of different steering positions (toe angles) of the steered wheel or wheels to resolve a trend line calculation (such as a regression analysis) representative of the relationship between the steering-angle sensitive alignment distance and the steering position of the steered wheel.

Because many distance measurements are preferably taken while the vehicle is steered to geometric centerline, the initial measurement of the steering-angle sensitive alignment distance can be adjusted using the trend line calculation representing the relationship between the steering-angle sensitive alignment distance and the steering position of the steered wheel and the thrust angle. The initial distance measurement can be shifted on the graph represented by the trend line by the amount of the thrust line angle to get a new initial distance relative to geometric centerline (0 degrees thrust line angle).

An alternate method of the present invention facilitates calculating the camber alignment angle $C_{Calc}$ of a steered vehicle wheel for a given steering-angle (toe angle), after an initial set of wheel alignment angle measurements are acquired for the steered vehicle wheel. The initial measurements are preferably acquired during a normal caster steer alignment procedure. The initial set of wheel alignment angle measurements for the steered vehicle wheel includes a measure of the camber alignment angle ($C_0$) at the 0° toe angle ($T_0$), a measured (calculated) caster angle K, and a measured (calculated) steering axis inclination S. In addition to the initial measurements, the steered wheel is steered to a preferred steering position. The preferred steering position is typically straight ahead relative to the vehicle thrust line, but could be any of several other positions including straight ahead relative to the vehicle center line, a predetermined steering position specification, or at $T_0$.

With the vehicle wheel steered to the preferred position, an associated camber angle measurement is acquired. The difference between the camber angle measured with the vehicle wheel steered straight ahead relative to thrust line ($C_{thrust}$) and the camber angle specification value represents the amount of camber angle adjustment necessary to bring the camber angle of the vehicle wheel to the specification value.

Using the initial set of measurements, the camber angle $C_{Calc}$ is calculated for any given steering-angle T of the steered vehicle wheel using the following conventional equations described in SAE Technical Paper No. 850219 "Steering Geometry and Caster Measurement" by Daniel B. January:

For positive steering axis inclination values $$C_{Calc} = \sin^{-1}\left[\frac{-Y - \sqrt{Y^2 - 4XZ}}{2X}\right] \quad \text{Eqn. (2A)}$$

and for negative steering axis inclination values $$C_{Calc} = \sin^{-1}\left[\frac{-Y + \sqrt{Y^2 - 4XZ}}{2X}\right] \quad \text{Eqn. (2B)}$$

where:

$$Z = Q2^2 - 1; \quad \text{Eqn. (3)}$$

$$Y = -2Q1 \cdot Q2; \quad \text{Eqn. (4)}$$

$$X = Q1^2 + 1; \quad \text{Eqn. (5)}$$

$$Q1 = \frac{1}{\cos T \cdot \tan S + \sin T \cdot \tan K}; \quad \text{Eqn. (6)}$$

and $$Q2 = Q1(\cos C_0 \cdot \tan S + \sin C_0) \quad \text{Eqn. (7)}$$

Figure 1:
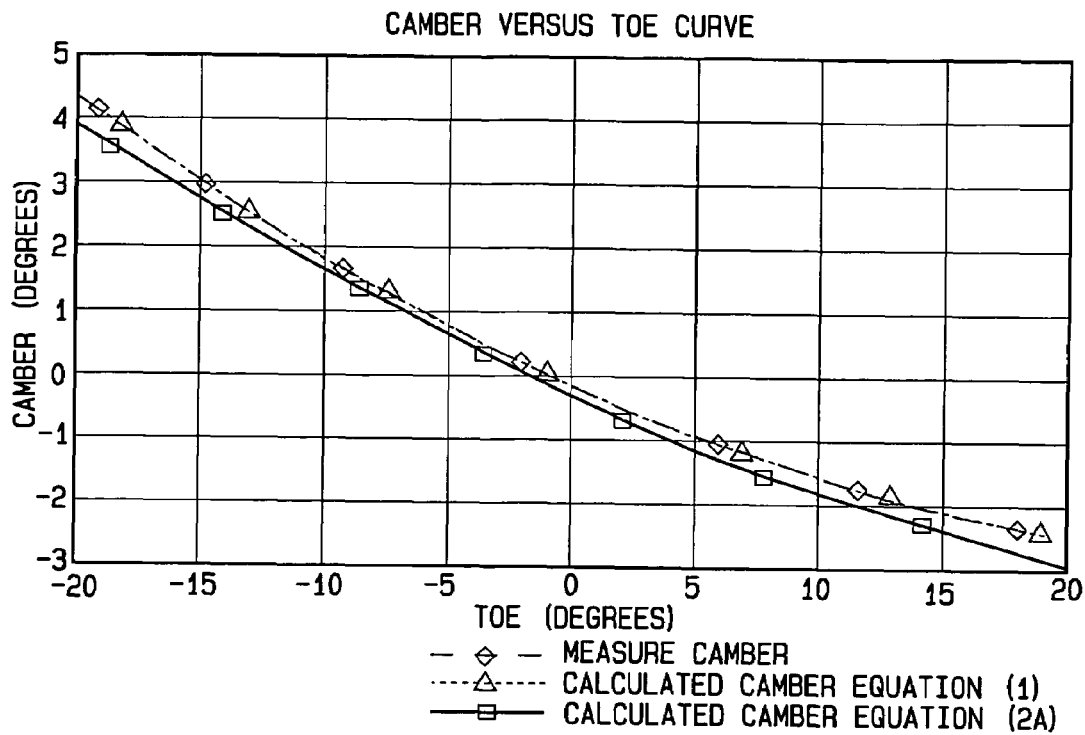
FIG. 1 is a plot of camber angle values versus steering-angle (toe angle) values for a steered vehicle wheel, illustrating measured data, theoretical data from Equation (1), and theoretical data from Equation (2A)

A plot of the calculated camber angle $C_{Calc}$ versus the steering-angle (toe angle) T for the vehicle wheel, shown in FIG. 1, is created using the trend line calculation of Equation (1), and the camber-specific Equation (2A). Once the camber angle $C_{Calc}$ is calculated for any given toe angle T, then a calculated camber change $C_{CalcChg}$ between the calculated camber angle $C_{Calc}$ and the measured camber angle at the "steer ahead relative to thrust" $C_{thrust}$ wheel steering position can be found as:

$$C_{CalcChg} = C_{Calc} - C_{Thrust} \quad \text{Eqn. (8)}$$

As shown in FIG. 1, the measured camber angle $C_{Meas}$ is plotted versus the toe angle T by taking measurements dynamically with wheel alignment sensors as the vehicle wheel is steered through an arc. The speed with which the vehicle's wheels are turned is preferably controlled such that the turn is made at an appropriate speed to enable the recording of a sufficient number of discrete toe angle and camber angle values.

The measured camber change $C_{MeasChg}$ between the measured camber angle $C_{Meas}$ at any steered angle (toe angle) position and the measured camber angle with the wheel steered straight ahead relative to the vehicle thrust line $C_{thrust}$ can be found as:

$$C_{MeasChg} = C_{Meas} - C_{Thrust} \quad \text{Eqn. (9)}$$

Figure 2:
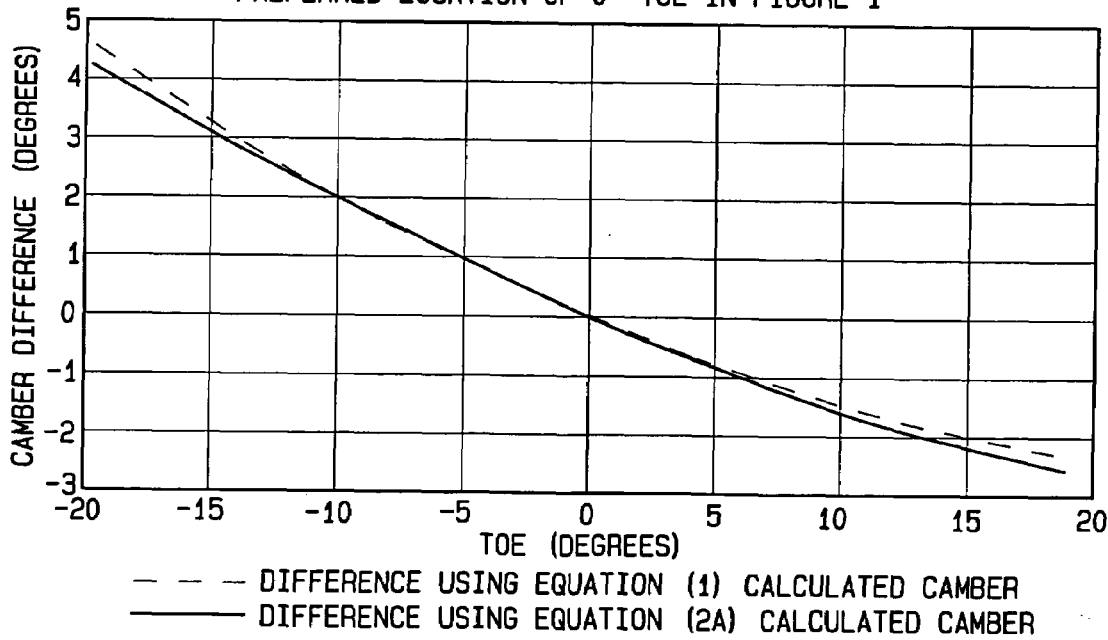
FIG. 2 is a plot of camber angle difference values versus steering-angle (toe angle) values for a steered vehicle wheel, illustrating the camber angle difference between the camber angle measured at 0° toe and the theoretical data from Equations (1) and (2)

If there has been no adjustment made to the camber angle then ideally $C_{Calc}$ and $C_{Meas}$ will be the same for a specified steering-angle (toe angle). If an adjustment has been made to the camber angle of the steered wheel, the plot of $C_{Meas}$ versus steering-angle (toe angle) will shift on the camber axis in the direction of the change. As shown in FIG. 2, the difference between the calculated camber change $C_{CalcChg}$ and the measured camber change $C_{MeasChg}$ no matter where the vehicle wheel is steered to is the amount of adjustment added to the camber angle measurement that is taken when the wheel is steered to a selected position such as steer ahead relative to vehicle thrust line $C_{Thrust}$ to give a toe adjusted camber angle.

$$C_{ToeAdjusted} = C_{Thrust} + (C_{MeasChg} - C_{CalcChg}) \qquad \text{Eqn. (10)}$$

For example, if a measured camber at steer ahead relative to thrust ($C_{Thrust}$) where thrust is 0° happens to be −0.309° as shown in FIG. 1, then the calculated change in camber $C_{CalcChg}$ for all toe angles can be calculated as shown in FIG. 2. At an exemplary specified steering-angle (toe angle) of −5.056°, a calculated camber angle is indicated as 0.649° (shown in FIG. 1), and a calculated change in camber $C_{CalcChg}$ from the selected steered location of $C_{thrust}$ is indicated as 0.958° (shown in FIG. 2).

The toe adjusted camber value presented by the alignment system would be the $C_{Thrust}$ value of −0.3090 regardless of where the vehicle was steered if the difference between the measured camber change $C_{MeasChg}$ and the calculated camber change $C_{CalcChg}$ is 0° meaning no adjustment to the camber angle has been made.

Figure 3:
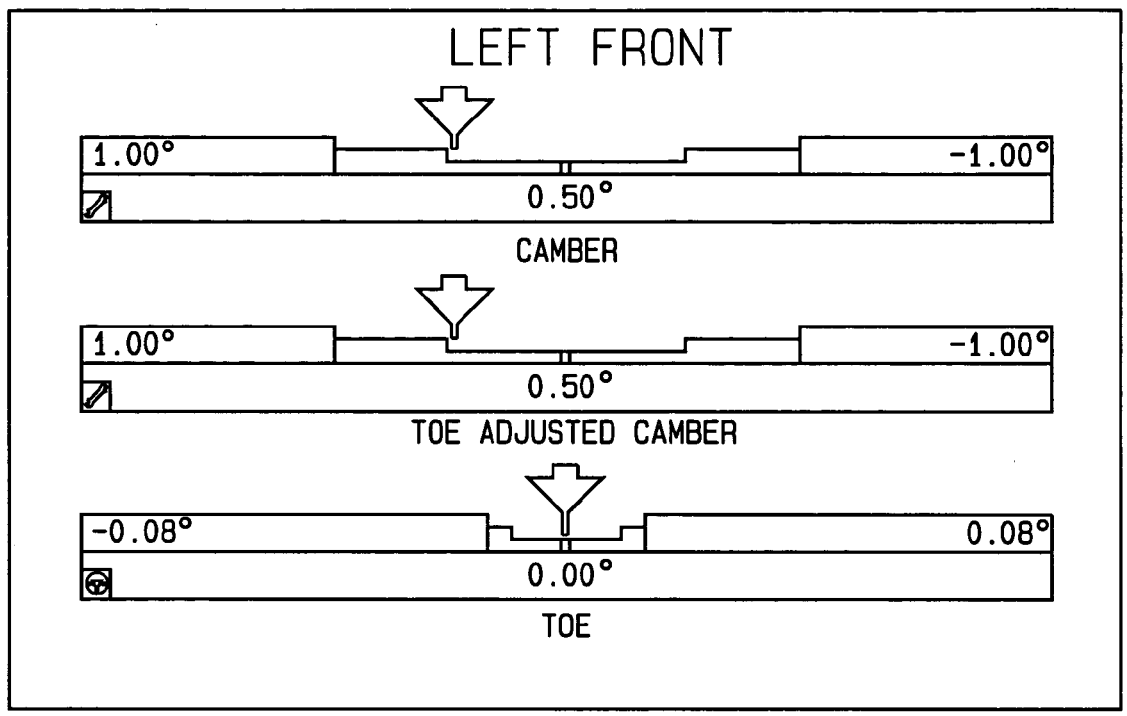
FIG. 3 illustrates an exemplary display of a measured camber angle value compensated for a current steering-angle of 0°.
Figure 4:
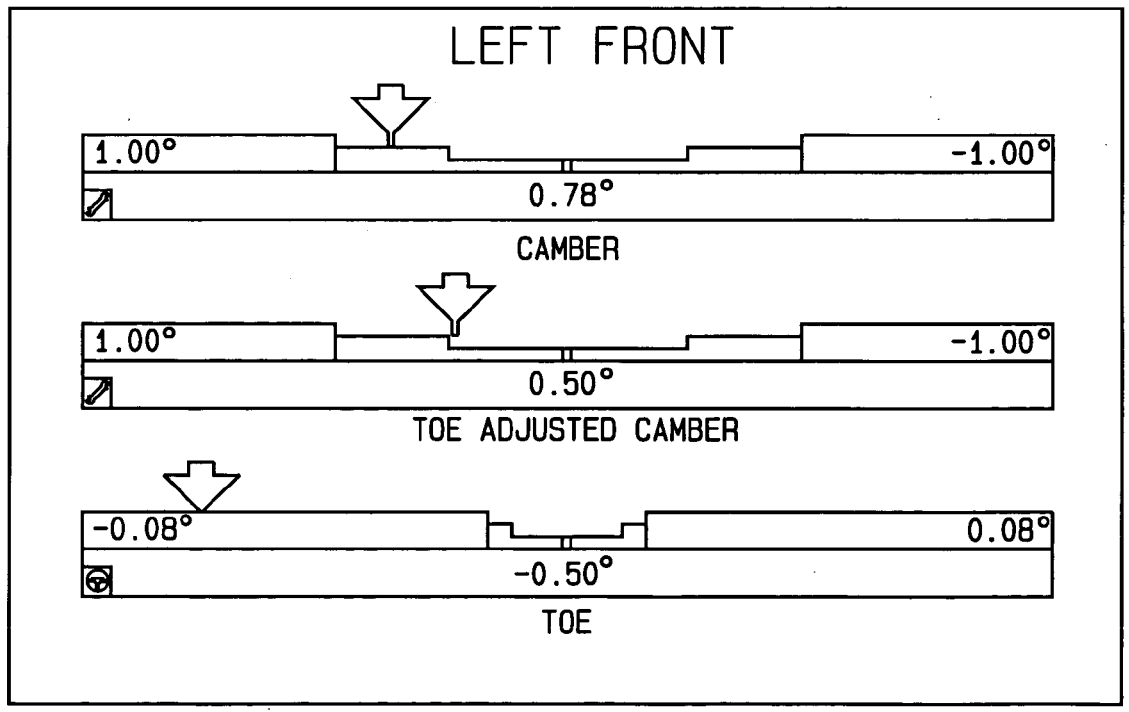
FIG. 4 illustrates an exemplary display of a measured camber angle value compensated for a current steering-angle of −0.50°.

Turning to FIGS. 3 and 4, an exemplary display of the measured camber angle and the toe adjusted camber angle at a given steering-angle (toe angle) is shown. FIG. 3 illustrates the measured camber angle and calculated camber angle at a 0° toe angle for a steered vehicle wheel. FIG. 4 illustrates the corresponding values for the same vehicle wheel when steered to a toe angle of −0.500 degrees. The "Toe Adjusted Camber" value remains the same, based on compensation for the change in the wheel toe angle.

The graphical display preferably includes both numerical and graphical representations of the displayed values, for example, in the form of bar graphs provided with a moving index, such as an arrow or dial, and a representative numerical value. When the vehicle wheel is steered, altering the toe angle, corresponding changes will be shown in the toe angle bar graph and the camber angle bar graph, while the toe adjusted camber angle bar graph remains at a fixed value representative of the amount of misalignment (if any) present in the camber angle from the selected camber angle specification or baseline value. The toe adjusted camber angle bar graph will remain unchanged unless the operator alters the actual camber angle setting for the vehicle wheel.

Using this display, a meaningful comparison is presented to an operator illustrating the current camber angle measurement and the specified camber angle value regardless of the current steering-angle position (toe angle) of the vehicle wheel. This information is utilized by an operator to determine an amount of adjustment, if any, required to bring the camber angle to within a predetermined tolerance of the specified camber angle value, independent of the toe angle of the vehicle wheel.

An alternative method for compensating the measured camber angle, taken at a preferred steered position $C_{Preferred}$, such as steer ahead relative to vehicle thrust angle, $C_{Thrust}$, for the effect of steering the vehicle wheel, is to subtract the calculated camber $C_{Calc}$ from the measured camber $C_{Meas}$ at all steering-angles (toe angles) and add that difference to $C_{Thrust}$ to give a toe adjusted camber angle.

$$C_{ToeAdjusted} = C_{Preferred} + (C_{Meas} - C_{Calc}) \qquad \text{Eqn. (11)}$$

In an alternate method of the present invention, an estimate of the measured camber value for various toe angles of a steered vehicle wheel is obtained using a trend line calculation, such as shown in Equation (1). Initially, data from the measured camber angle and measured toe angle is acquired dynamically as the vehicle wheel is steered preferably to a steering-angle greater than or equal to ±10°. The measured camber value for the vehicle wheel steered to a preferred location for measurement, such as in the straight ahead position relative to thrust line, $C_{Thrust}$ is acquired. Once the trend line representing camber $C_{Calc}$ for any toe angle T of the steered wheel is known, the above Equations (8), (9), (10), and (11) can be applied. The measured camber value is then preferably presented by the alignment system on a modified camber angle bar graph or other visual display as previously described in connection with FIGS. 3 and 4.

Using Equation (1) as described above is one valid method for determining a trend line of measured camber angles versus measured toe angles. One of ordinary skill in the art will recognize that a wide range of polynomial equations other than Equation (1) and trend line calculation techniques may be utilized with the methods of the present invention. For example, if it is assumed that the change in the camber angle of a steered vehicle wheel is substantially linear with a change in the steered angle of the steered wheel, a slope of the camber angle versus toe angle plot can be used to calculate a camber angle measurement for any given toe angle measurement using the equation y=mx+b, where 'y' represents the camber angle measurement, 'm' is the slope of the camber angle measurement versus toe angle measurement, 'x' represents the toe angle measurement, and 'b' represents the camber angle measurement at the steered location of 0° toe angle measurement. For many vehicles this would be a valid trend line representation for a small range of toe angle measurements.

Similar to the camber angle (C), the live caster angle ($K_{Live}$) for a steered vehicle wheel can be calculated relative to the toe angle (T) of the steered vehicle wheel in an alternate method of the present invention. Live caster angle ($K_{Live}$) is an angle measured directly by the alignment sensor. Measured (calculated) caster angle (K) is the caster calculated from two or more measurements of alignment angles from alignment sensors at two different steered locations.

To calculate live caster angle ($K_{Live}$) relative to the toe (T) angle, an initial set of wheel alignment angle measurements are acquired for a steered vehicle wheel. The measurements are preferably acquired during a normal caster steer alignment procedure. The initial set of wheel alignment angle measurements for the steered vehicle wheel preferably include a measure of the live caster alignment angle $K_{Live0}$ at the 0° toe angle $T_0$, a measured (calculated) caster angle K, and a measured (calculated) steering axis inclination S. In addition to these initial measurements, the steered wheel is steered to a preferred steering position. The preferred steering position is typically straight ahead relative to the vehicle thrust line, but could be one of several other positions, including straight ahead relative to the vehicle center line, or to a 0° toe angle $T_0$.

When the wheel is steered to the preferred steering position, a corresponding live caster angle measurement is acquired. Having made no adjustments to the vehicle's caster, live caster angle should match the measured (calculated) caster when steered to the preferred steering position. The difference between the measurement of the live caster angle at a selected steering position such as steer ahead relative to vehicle thrust ($K_{LiveThrust}$) and the caster angle specification represents the amount of caster angle adjustment that is necessary to alter the caster angle to within a predetermined tolerance of the specification value.

Using the acquired initial measurements, a live caster alignment angle $K_{LiveCalc}$ is calculated for any given steering-angle (toe angle T) of the steered vehicle wheel using the following equations:

For Q1 (Equation 16) values greater than or equal to zero:

$$K_{LiveCalc} = \sin^{-1}\left[\frac{-Y - \sqrt{Y^2 - 4XZ}}{2X}\right] \quad \text{Eqn. (12A)}$$

and for Q1 (Equation 16) values less than zero:

$$K_{LiveCalc} = \sin^{-1}\left[\frac{-Y + \sqrt{Y^2 - 4XZ}}{2X}\right] \quad \text{Eqn. (12B)}$$

where:

$$Z = Q2^2 - 1; \quad \text{Eqn. (13)}$$

$$Y = -2Q1 \cdot Q2; \quad \text{Eqn. (14)}$$

$$X = Q1^2 + 1; \quad \text{Eqn. (15)}$$

$$Q1 = \frac{1}{\tan S \cdot \sin T + \tan K \cdot \cos T}; \quad \text{Eqn. (16)}$$

and $$Q2 = Q1(\tan K \cos K_{Live0} + \sin K_{Live0}). \quad \text{Eqn. (17)}$$

Figure 5:
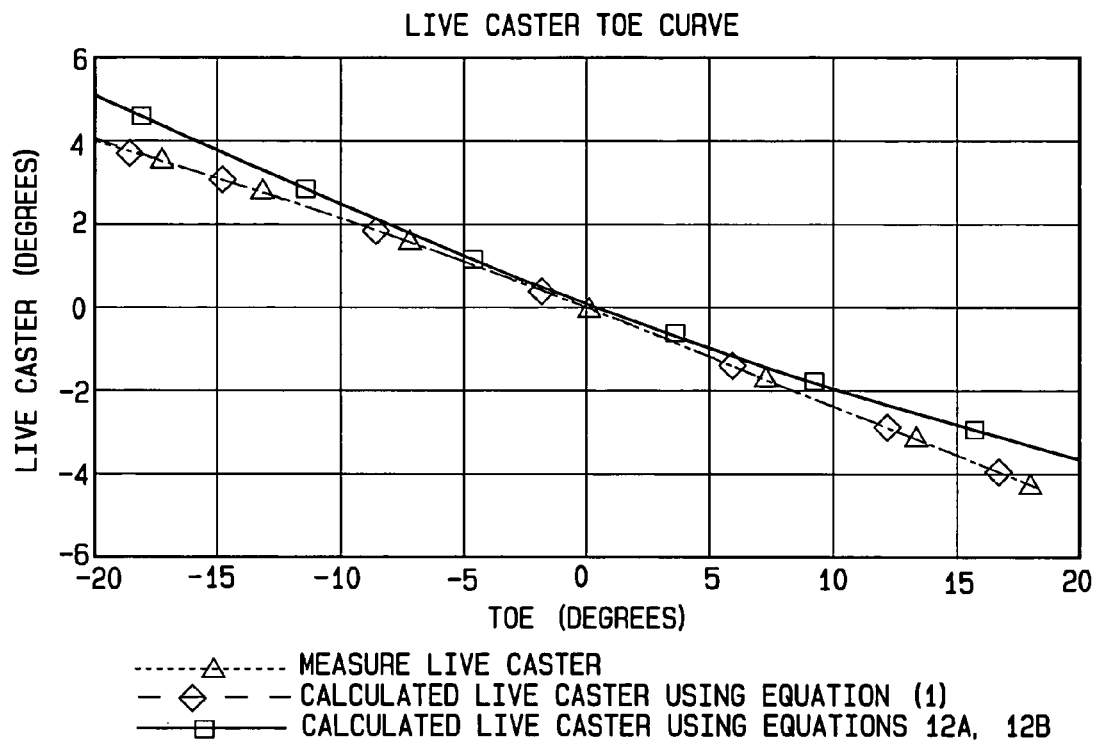
FIG. 5 is a plot of live caster angle values versus steering-angle (toe angle) values for a steered vehicle wheel, illustrating measured data, theoretical data from Equation (1), and theoretical data from Equations (12A, 12B)

The calculated live caster angle $K_{LiveCalc}$ may be plotted versus the toe angle T for a steered vehicle wheel using the trend line Equation (1) or the caster-specific equations 12A and 12B, as shown in FIG. 5. Once the calculated live caster angle $K_{LiveCalc}$ value is determined for a given toe angle T, then the calculated live caster change $K_{LiveCalcChg}$ between the calculated live caster angle $K_{LiveCalc}$ and the measured live caster angle taken at a selected steering position such as steer ahead relative to vehicle thrust angle $K_{LiveThrust}$ can be found as:

$$K_{LiveCalcChg} = K_{LiveCalc} - K_{LiveThrust} \quad \text{Eqn. (18)}$$

Additionally as shown in FIG. 5, a plot of the measured live caster angle $K_{Live}$ versus the toe angle T is created by taking measurements dynamically with alignment sensors as the vehicle wheel is steered about an arc. The speed with which the vehicle's wheels are turned is preferably controlled such that the turn is an appropriate speed to enable recording a sufficient number of discrete toe angle and live caster angle values. The measured live caster change $K_{LiveChg}$ between the measured live caster angle $K_{Live}$ at any steering-angle (toe angle) position and the measured live caster angle taken at a preferred steering position such as steer ahead relative to thrust line $K_{LiveThrust}$ can be found as:

$$K_{LiveChg} = K_{Live} - K_{LiveThrust} \quad \text{Eqn. (19)}$$

The difference between the calculated live caster change $K_{LiveCalcChg}$ and the live caster change $K_{LiveChg}$, no matter where the vehicle wheel is steered, is the amount of adjustment added to the live caster angle measurement that is taken when the wheel is steered to a selected position such as $K_{LiveThrust}$ to give a toe adjusted live caster angle.

$$K_{LiveToeAdjusted} = K_{LiveThrust} + (K_{LiveChg} - K_{LiveCalcChg}) \quad \text{Eqn. (20)}$$

Figure 6:
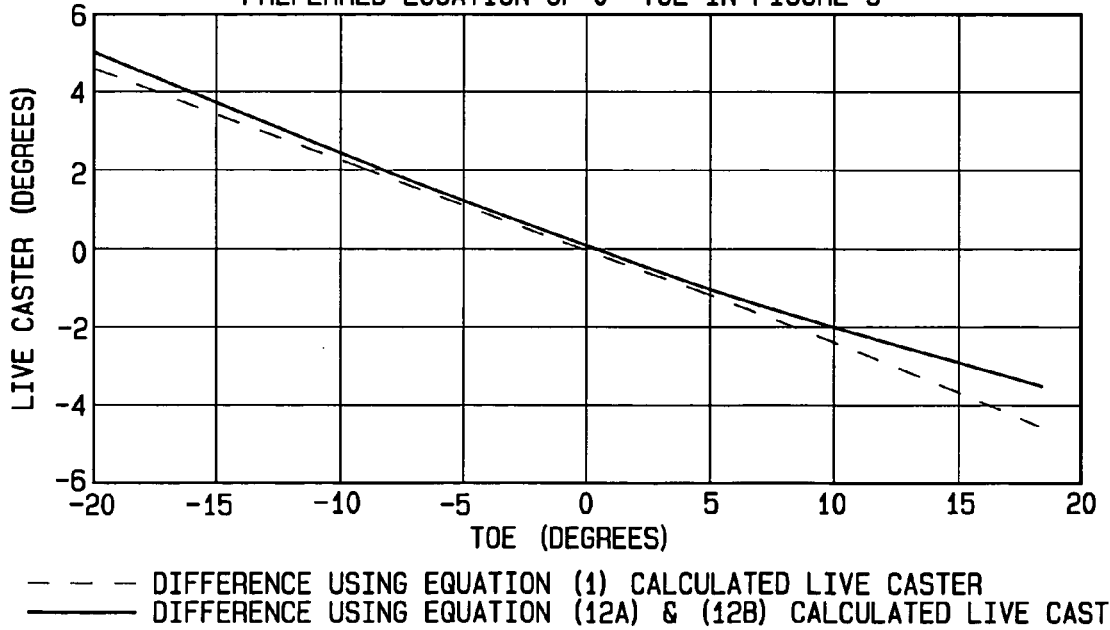
FIG. 6 is a plot of live caster angle difference values versus steering-angle (toe angle) values for a steered vehicle wheel, illustrating the live caster difference between live caster measured at a preferred steering-angle of 0° toe and theoretical data from Equations (1) and (12A, 12B)

For example, if $K_{LiveThrust}$ is measured at 0.023° as shown in FIG. 5 where thrust is 0°, then the calculated change in live caster $K_{LiveCalcChg}$ for all toe angles can be calculated as shown in FIG. 6. At an exemplary specified steering-angle (toe angle) of 5.075°, the corresponding calculated live caster $K_{LiveCalc}$ is found to be negative 1.109° (as shown in FIG. 5), resulting in a calculated change in live caster $K_{LiveCalcChg}$ of 1.132° from $K_{LiveThrust}$. The difference between the measured live caster change $K_{LiveChg}$ and the calculated change in live caster $K_{LiveCalcChg}$ at the specified steering-angle is 0° when no adjustment has been made to the vehicle wheel. The steering adjusted live caster $K_{LiveThrust}$ value presented by the alignment system would be 0.023° since there has been no adjustment to the caster angle of the vehicle wheel.

Figure 7:
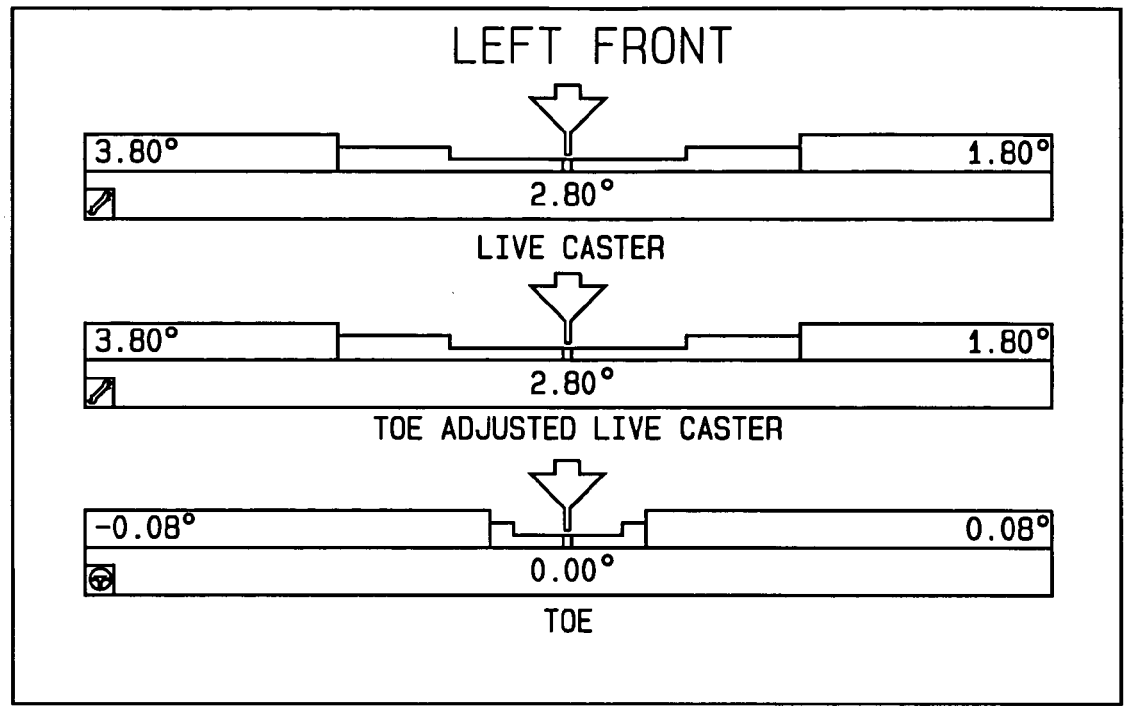
FIG. 7 illustrates an exemplary display of a measured live caster angle value compensated for a current steering-angle of 0°.
Figure 8:
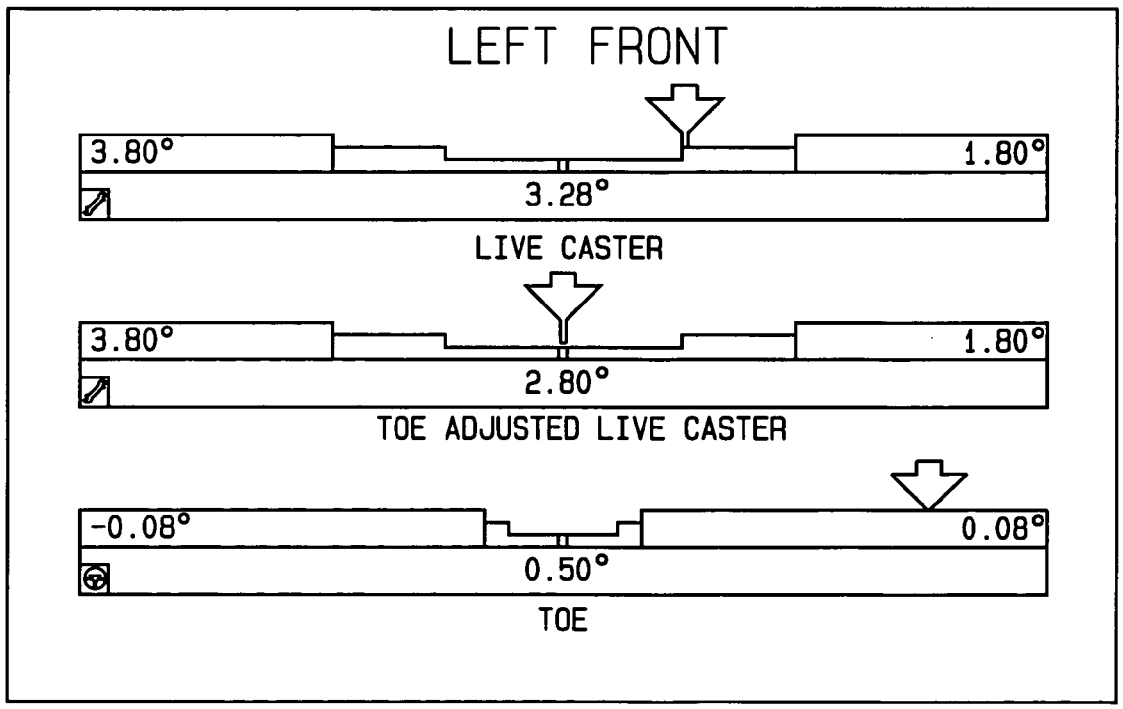
FIG. 8 illustrates an exemplary display of a measured live caster angle value compensated for a current steering-angle of 0.50°.

Turning to FIGS. 7 and 8, an exemplary display of the measured live caster angle and the toe adjusted live caster angle for a given steering-angle (toe angle) is shown. The display preferably includes both numerical and graphical representations of the displayed values, for example, in the form of bar graphs each provided with a moving index and a numerical value. FIG. 7 illustrates the correspondence between the measured live caster angle and the toe adjusted live caster angle for a toe angle of 0°, while FIG. 8 illustrates the difference between the measured live caster angle and the toe adjusted live caster angle when the vehicle wheel is steered to a toe angle of 0.50°.

When the vehicle wheel is steered, altering the toe angle, corresponding changes will be shown in the toe angle bar graph and the measured live caster angle bar graph, while the toe adjusted live caster angle bar graph remains at a fixed value representative of the amount of misalignment (if any) present in the live caster angle from the selected caster angle specification or baseline value. The toe adjusted live caster angle bar graph and value remains unchanged unless the operator alters the caster angle setting for the vehicle wheel.

Using displays such as shown in FIGS. 7 and 8, a meaningful comparison is presented between the current live caster angle measurement and the specified caster angle value regardless of the current steering-angle position (toe angle) of the vehicle wheel, permitting the operator to determine an amount of adjustment, if any, required to bring the live caster angle to within a predetermined tolerance of the specified caster angle value.

An alternative method for compensating a measured live caster angle value for the effect of steering the vehicle wheel from a preferred steered location is to subtract the calculated live caster angle $K_{LiveCalc}$ from the live caster angle $K_{Live}$ at the current steer angle and add that difference to the live caster measured at the selected location such as steer ahead relative to thrust ($K_{LiveThrust}$) to give a toe adjusted live caster angle.

$$K_{LiveToeAdjusted} = K_{LiveThrust} + (K_{Live} - K_{LiveCalc}) \quad \text{Eqn. (21)}$$

In an alternate method of the present invention, estimates of the live caster value for various toe angles of a steered vehicle wheel are obtained using a trend line calculation, such as shown in Equation (1). Initially, data representative of the live caster angles and corresponding measured toe angles is acquired dynamically as the vehicle wheel is steered about an arc, preferably to a steering-angle greater than or equal to positive and negative 10°. In addition, the live caster angle value for the vehicle wheel steered to a preferred location for measurement, such as in the straight ahead position relative to the vehicle thrust line, $K_{LiveThrust}$ is acquired. Once the trend line representing live caster $K_{LiveCalc}$ is determined for any toe angle T, the above Equations (18), (19), (20), and (21) can be applied.

The live caster value is then preferably presented by the alignment system on a modified live caster angle bar graph or other visual display such that it appears to be the live caster angle as measured in the preferred location for adjustment, as required by the vehicle manufacturer specifications, independent of where the vehicle wheel is currently steered, as previously described in connection with FIGS. 7 and 8.

Using Equation (1) as described above is one valid method for determining a trend line of measured live caster angles versus measured toe angles. Alternative trend line determination methods exist as are well known in the art, and may be used as applicable to the ideas in this invention.

In an alternate method of the present invention, live caster angle values and toe angle values are measured dynamically and in a controlled manner as the vehicle's wheels are steered through an arc. Preferably, the alignment data is collected during a conventional caster angle measurement procedure. The speed at which vehicle's wheels are turned is controlled such that the wheels are turned slowly enough to enable recording of sufficient toe angle data and live caster angle data for resolving a trend line algorithm, but sufficiently fast enough that the alignment system is perceived as responsive to an operator. One method of directing an operator through a speed controlled steering procedure utilizes a steering-angle (toe angle) bar graph on which the specification range of the bar graph changes in value over a predetermined period of time. The alignment technician is directed to steer the vehicle wheel such that the wheels remain within the changing specification range of the bar graph, enabling the wheel alignment system to acquire sufficient measurements to resolve a trend line algorithm.

Figure 9:
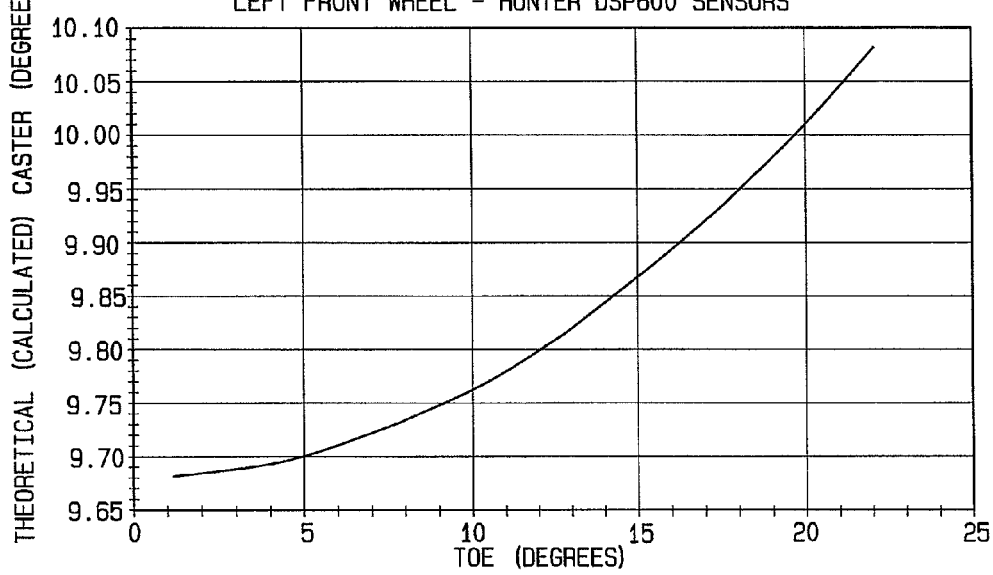
FIG. 9 is a graph of theoretical caster angle values versus steering-angle (toe angle) values for a steered vehicle wheel.

In an alternate method of the present invention, an initial set of wheel alignment angle measurements are acquired for a steered vehicle wheel. The measurements are preferably acquired during a caster steer alignment procedure. The initial set of wheel alignment angle measurements include at least a measure of the necessary alignment angles to establish a camber angle (C) versus toe angle (T) plot as previously described. Using a camber angle versus toe angle algorithm, such as previously described, to resolve the camber angle for any toe angle, a plot of calculated caster angles K versus toe angles can be created using a suitable caster angle algorithm, such as is shown in FIG. 9. For example:

$$K = \tan^{-1}\left[\frac{\sin C1 - \sin C2}{\sin T2 - \sin T1}\right] \qquad \text{Eqn. (22)}$$

The plot can be described using a trend line algorithm, or preferably, a 3rd order polynomial algorithm such as Equation (1), and calculated caster can be produced for a specific toe angle where T2 equals T1. A plot can also be described using the same technique only by varying the amount that T2 is greater or less than T1. Optionally, the plot of camber versus toe is displayed to an alignment technician during a vehicle wheel alignment procedure.

In an alternate method of the present invention, a calculated caster angle difference is calculated. Most caster specifications are specified for a vehicle measured using a steer procedure where the vehicle is steered left and right to a 10 degree steer angle or a 20 degree steer angle. As FIG. 9 shows, if the vehicle is not measured at the appropriate steer angle there will be an error in the calculated caster. The caster angle difference between the calculated caster at a random steer angle and the calculated caster at a specification reference angle of a 10 degree steer angle or a 20 degree steer angle is calculated as Equation (23):

$$\text{Caster\_Angle\_Difference} = \frac{\text{Calculated\_Caster\_Angle\_Difference}}{\text{Caster\_Angle\_At\_reference}} * 100\% \qquad \text{Eqn. (23)}$$

Optionally, a plot of the caster angle difference against the associated toe angle can be displayed to an alignment technician during a vehicle wheel alignment procedure.

Figure 10:
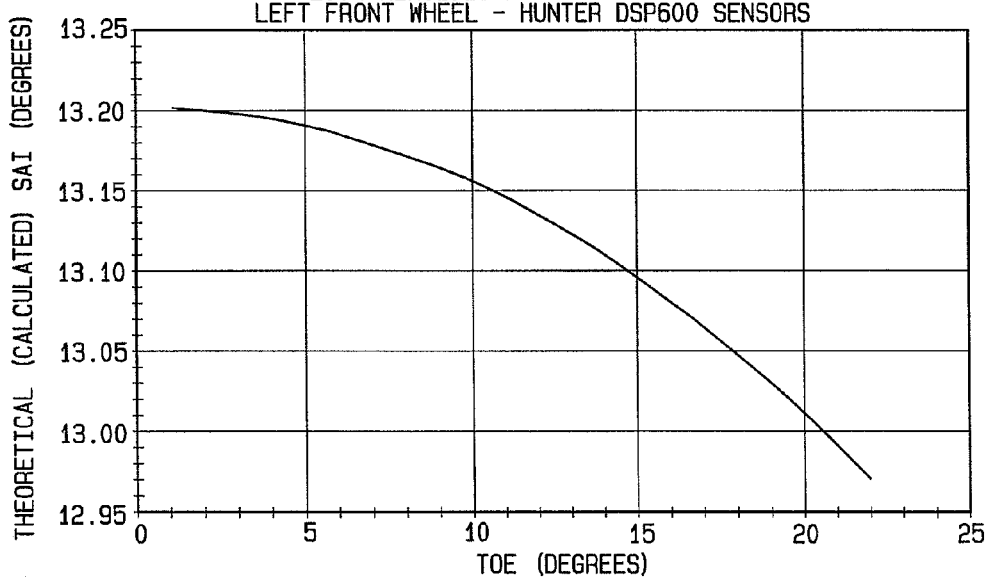
FIG. 10 is a graph of theoretical steering axis inclination angle values versus steering-angle (toe angle) values for a steered vehicle wheel.

In an alternate method of the present invention, an initial set of wheel alignment angle measurements are acquired for a steered vehicle wheel. The measurements are preferably acquired during a caster steer alignment procedure. The initial set of wheel alignment angle measurements include at least a measure of the necessary alignment angles to mathematically describe a live caster angle versus toe angle plot as previously described. Using the live caster angle versus toe angle algorithm to resolve the live caster angle for any toe angle, a plot of the calculated steering axis inclination (SAI) versus the toe angle is generated using a suitable SAI algorithm, such as shown in FIG. 10. For example:

$$SAI = \tan^{-1}\left[\frac{\sin K1_{Live} - \sin K2_{Live}}{\sin T2 - \sin T1}\right] \qquad \text{Eqn. (24)}$$

The plot can be described using a trend line algorithm as previously described, or preferably, using a 3rd order polynomial algorithm as described in Equation (1), such that a calculated value for the steering axis inclination of the steered wheel can be produced for any specific toe angle where T2 equals T1. A plot can also be described using the same technique only by varying the amount that T2 is greater or less than T1. Optionally, the plot of caster versus toe is displayed to an alignment technician during a vehicle wheel alignment procedure.

In an alternate method of the present invention, a calculated steering axis inclination angle difference is calculated. Most steering axis inclination specifications are specified for a vehicle measured using a steer procedure where the vehicle is steered left and right to a 10 degree steer angle or a 20 degree steer angle. As FIG. 10 shows, if the vehicle is not measured at the appropriate steer angle there will be a difference in the calculated SAI. The steering axis inclination angle difference between the calculated steering axis inclination at a random steer angle and the calculated steering axis inclination at a specification reference angle of a 10 degree steer angle or a 20 degree steer angle is calculated as:

$$\text{SAI\_Difference} = \frac{\text{Calculated\_SAI\_Difference}}{\text{SAI\_At\_reference}} * 100\% \qquad \text{Eqn. (25)}$$

Optionally, a plot of the steering axis inclination angle difference against the associated toe angle can be displayed to an alignment technician during a vehicle wheel alignment procedure.

In an alternate method of the present invention, an initial set of wheel alignment angle measurements are acquired for a steered vehicle wheel. The measurements are preferably acquired during a caster steer alignment procedure. The initial set of wheel alignment angle measurements include sufficient measurements of the alignment angles necessary to generate a live caster angle versus toe angle plot and a camber angle versus toe angle plot, as previously described. A plot of the calculated caster angle (K) versus toe angle (T) and the calculated SAI angle (S) versus toe angle (T) is generated using a suitable algorithm which requires camber angle C, live caster angle $K_{Live}$, and toe angle measurements T, as is known in the art. For example:

$$K = \tan^{-1}\left(\frac{C - AD}{1 - BD}\right) \quad \text{Eqn. (26)}$$

$$S = \tan^{-1}\left(\frac{A - BC}{1 - BD}\right) \quad \text{Eqn. (27)}$$

$$A = \frac{\sin K1_{Live} - \sin K2_{Live}}{\sin T2 \cos K2_{Live} - \sin T1 \cos K1_{Live}} \quad \text{Eqn. (28)}$$

$$B = \frac{\cos T2 \cos K2_{Love} - \cos T1 \cos K1_{Live}}{\sin T2 \cos K2_{Live} - \sin T1 \cos K1_{Live}} \quad \text{Eqn. (29)}$$

$$C = \frac{\sin C1 - \sin C2}{\cos C2 \sin T2 - \cos C1 \sin T1} \quad \text{Eqn. (30)}$$

$$D = \frac{\cos C2 \cos T2 - \cos C1 \cos T1}{\cos C2 \sin T2 - \cos C1 \sin T1} \quad \text{Eqn. (31)}$$

The plots for camber C versus toe T and for live caster $K_{Live}$ versus Toe T can be described using a trend line algorithm, or preferably using a 3rd order polynomial algorithm, such as described in Equation (1), to produce calculated caster angles and calculated SAI angles using Equations (26)-(31) for a specific toe angle where T2 equals T1. Enough calculated caster angles and calculated SAI angles can be created in this manner to describe a plot of calculated caster versus toe and calculated SAI versus toe where T2 equals T1. Alternatively, these plots can be described using a trend-line algorithm. Similar plots can also be described using the same technique only by varying the amount that T2 is greater or less than T1. Optionally, at least one plot is displayed to an alignment technician during a vehicle wheel alignment procedure.

In an alternate method of the present invention, a calculated caster angle difference and calculated SAI angle difference is calculated. Most caster and SAI specifications are specified for a vehicle measured using a steer procedure where the vehicle is steered left and right to a 10 degree steer angle or a 20 degree steer angle. As FIG. 9 and FIG. 10 shows, if the vehicle is not measured at the appropriate steer angle there will be a certain amount of error. The caster angle difference between the calculated caster at a random steer angle and the calculated caster at a specification reference angle of a 10 degree steer angle or a 20 degree steer angle is calculated as in Equation 23. The steering axis inclination angle difference between the calculated steering axis inclination at a random steer angle and the calculated steering axis inclination at a specification reference angle of a 10 degree steer angle or a 20 degree steer angle is calculated as in Equation 25.

Optionally, a plot of the caster and SAI angle difference against the associated toe angle can be displayed to an alignment technician during a vehicle wheel alignment procedure.

Figure 11:
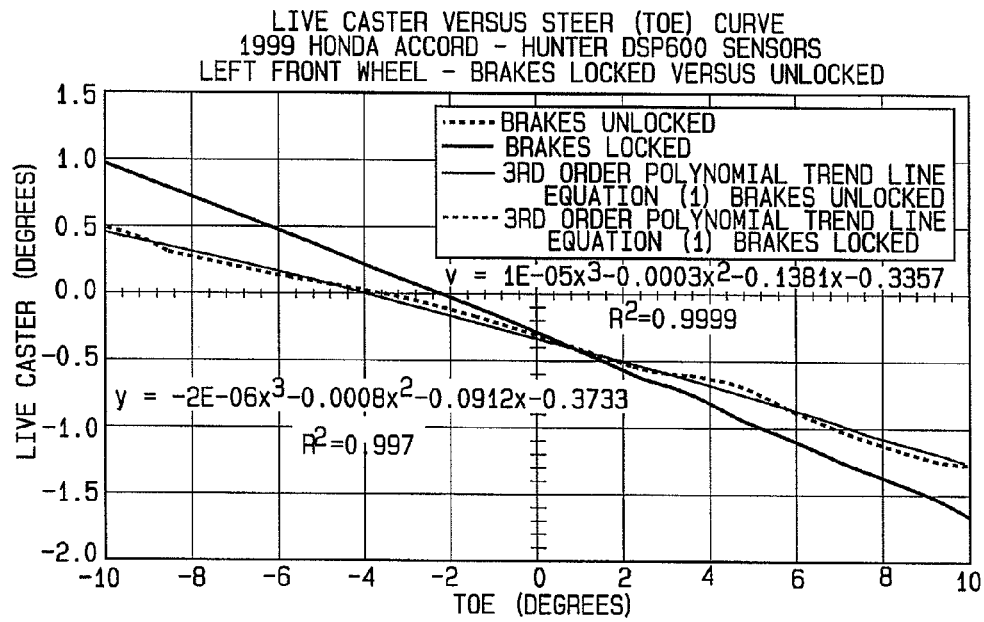
FIG. 11 is a graph of live caster angle values versus steering-angle (toe angle) values for a steered vehicle wheel, illustrating measured data when the vehicle brakes are locked, measured data when the vehicle brakes are unlocked, theoretical data from Equation (1) when the vehicle brakes are locked, and theoretical data from Equation (1) when the vehicle brakes are unlocked.

An alternate method of the present invention is provided for determining if the wheel brakes of a vehicle are in a "locked" condition during a vehicle wheel alignment angle measurement procedure which requires a steered vehicle wheel to be steered through an arc. Live caster angle measurements and toe angle measurements are acquired for a steered vehicle wheel as the wheel is steered about an arc. Each measurement value is compared to a corresponding live caster versus toe curve value obtained from a previously determined theoretical caster-toe relationship or the current alignment caster-toe relationship, as is illustrated in FIG. 11. If the measured live caster angle value varies from the corresponding theoretical live caster angle value for a given toe angle by more than a predetermined threshold, it is interpreted as an indication that the vehicle wheel brakes are not in a "locked" condition, and that the vehicle wheel has rolled during the steering procedure, altering the various alignment angles. A suitable warning is provided to the operator in response to the detection of wheel roll.

The predetermined threshold value utilized for the comparison between the measured live caster angle value and the theoretical live caster angle value is preferably calculated for each individual vehicle model based upon known caster angle and steering axis inclination specifications for the vehicle, providing a locked brake detection process which is customized to each individual vehicle model. Alternatively the threshold can be a predetermined value or it can be input either manually or from a database such as the alignment system specification database.

Figure 12:
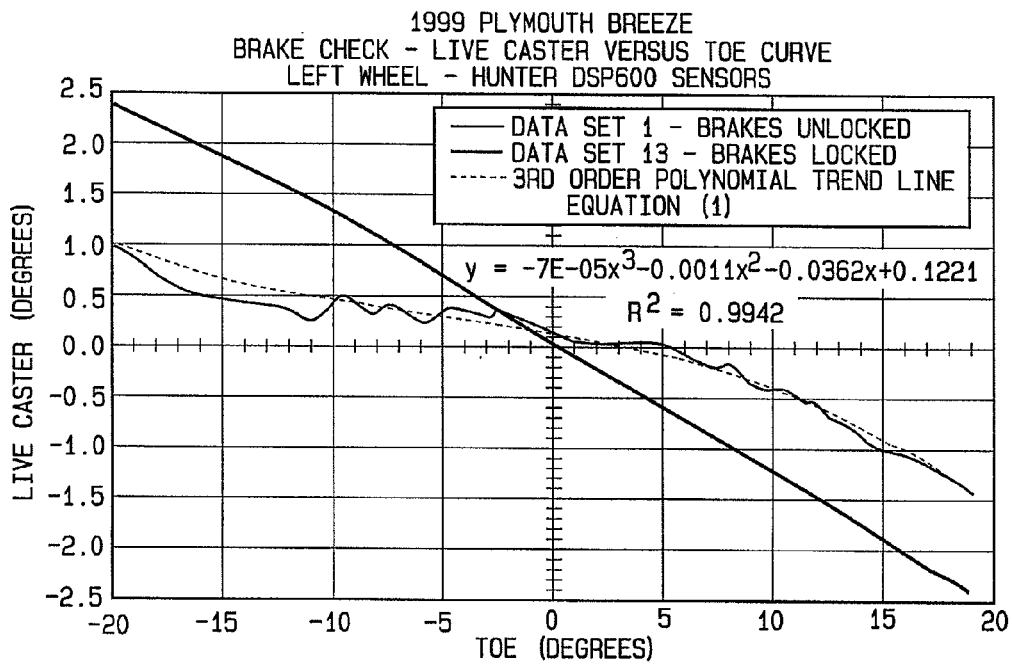
FIG. 12 is a graph of live caster angle values versus steering-angle (toe angle) values for a steered vehicle wheel, illustrating measured data when the vehicle brakes are locked, when the vehicle brakes are unlocked, and theoretical data from Equation (1)

An alternate method of the present invention for determining if vehicle brakes are in a "locked" condition during a vehicle wheel alignment angle measurement procedure requires a vehicle wheel to be steered through an arc. Live caster angle measurements and toe angle measurements are acquired as the wheel is steered. A plot of the live caster measurements versus the toe angle measurements is created, such as shown in FIG. 12. A corresponding trend line such as that described in Equation (1) is generated from the measurements to enable a calculated live caster measurement to be determined for any given toe angle measurement. A statistical operation such as the coefficient of determination ($R^2$) is then performed using the measured values to determine a proportion of variation of the measured live caster values for a specific toe value from the corresponding calculated caster value determined by the trend line algorithm. If the variation of the measured data from the trend line for a given toe angle measurement exceeds a predetermined threshold, it is interpreted as an indication that the vehicle brakes are not in a "locked" condition, and that the vehicle wheel has rolled during the steering procedure, altering the various alignment angles. A suitable warning is provided to the operator. The coefficient of determination denotes the strength of the linear association between the live caster values and the live toe values.

An alternate method of the present invention for determining if vehicle brakes are in a "locked" condition during a vehicle wheel alignment angle measurement procedure requires a vehicle wheel to be steered through an arc. Live caster angle measurements and toe angle measurements are acquired as the wheel is steered. A plot of the live caster measurements versus the toe angle measurements is created, such as shown in FIG. 12. A corresponding trend line such as that described in Equation (1) is generated from the measurements to enable a calculated live caster measurement to be determined for any given toe angle measurement. A statistical operation such as the calculation of the linear correlation coefficient (r) which measures the strength and direction of a linear relationship between two variables is performed using the measured live caster values for associated specific toe values. The mathematical formula for computing the linear correlation coefficient where n is the number of pairs of measured live caster angle and associated measured toe angle, x is measured toe angle, and y is measured live caster angle is:

$$r = \frac{n\sum xy - (\sum x)(\sum y)}{\sqrt{n(\sum x^2) - (\sum x)^2}\sqrt{n(\sum y^2) - (\sum y)^2}} \quad \text{Eqn. (32)}$$

The linear correlation value is such that $-1 \leq r \leq +1$ If the linear correlation (r) exceeds a predetermined threshold, it is interpreted as an indication that the vehicle brakes are not in a "locked" condition, and that the vehicle wheel has rolled during the steering procedure, altering the various alignment angles. A suitable warning is provided to the operator.

An alternate method of the present invention shown in FIG. 19, compensates a toe alignment angle T of a steered vehicle wheel for the TOOT effect of the suspension and steering geometry. An initial set of wheel alignment angle measurements are acquired for each steered vehicle wheel on an axle, preferably during a caster steer alignment procedure which requires the steered wheels to be turned through an arc. Alternatively, the toe angle data may be collected dynamically and asynchronously for each steered vehicle wheel, and associated with a time stamp, allowing an accurate reconstruction of the correspondence between measurements at each wheel.

Figure 13:
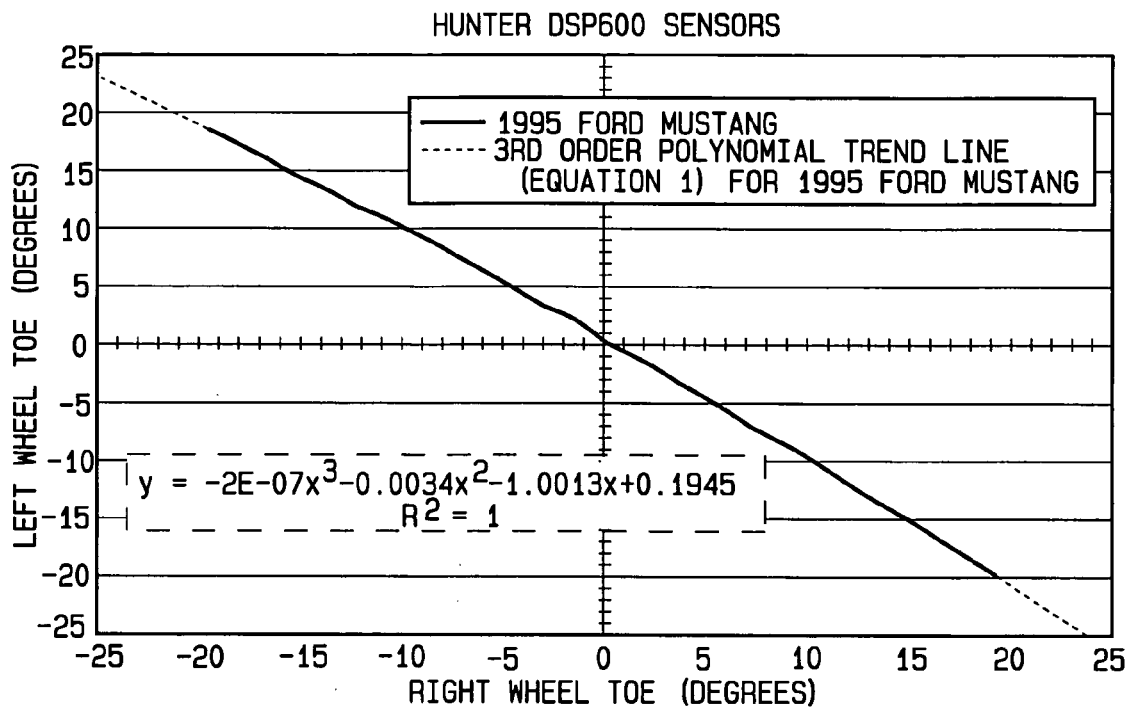
FIG. 13 is a plot of a measured left wheel toe angle versus a measured right wheel toe angle together with calculated trend line.

The initial set of wheel alignment angle measurements preferably includes at least a sufficient number of measurements of the toe angle for each of the steered vehicle wheels at discrete steering-angle positions to resolve a toe angle trend line calculation, such as shown in Equation (1). A plot of the toe angle for one steered wheel versus the toe angle for the opposite steered wheel is made from the initial set of wheel alignment measurements, as shown in FIG. 13. Optionally the plot is displayed by the alignment system during a wheel alignment procedure.

Preferably, a 3rd order polynomial trend line, such as Equation (1), is used to describe the plot of the toe angle data from a minimum of four toe angle measurements for each steered wheel. Alternatively, a linear trend line y=mx+b, where 'm' is the slope and 'b' is the y-intercept, may be utilized with a minimum of two toe angle measurements for each steered wheel and a third toe angle measurement at the 0° toe angle representing the y-intercept (b).

Figure 14:
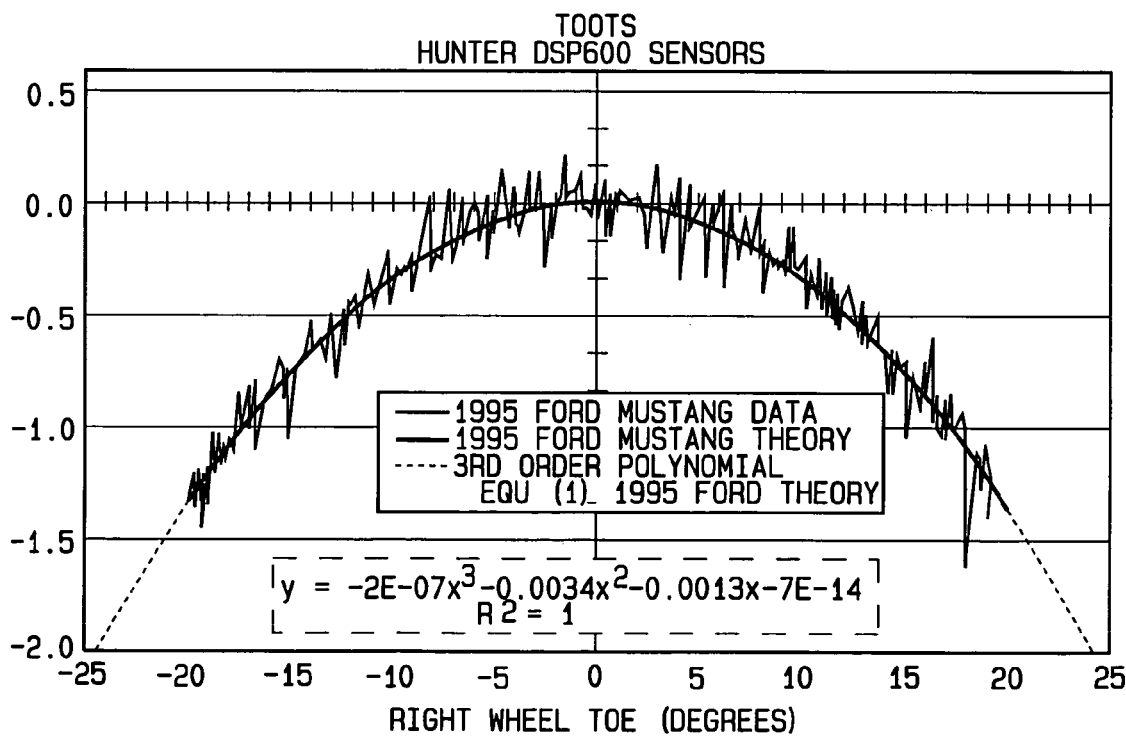
FIG. 14 is a graph of TOOT steering values representative of a sum of measured right wheel toe angles and left wheel toe angles, together with a calculated trend line representative of the TOOT steering values.

Once the trend line calculation for the toe angle relationships is determined, the amount of the Toe Out On Turns (TOOT) effect for a steered wheel can be calculated and plotted, as shown in FIG. 14. For example, using the TOOT relationship for the toe of a particular wheel, the TOOT value for toe at 20 degrees, which is a common measurement in the industry, can be calculated. Optionally the plot is displayed by the alignment system during a wheel alignment procedure. To create the TOOT plot shown in FIG. 14, the data from the trend line calculation (FIG. 13) is used to calculate the toe angle for the first steered wheel from the toe angle for the second steered wheel. The sum of the toe angle values for each steered wheel defines the TOOT value. The TOOT value at 0° toe is then optionally subtracted from all remaining TOOT values to offset the graphical representation by an amount representative of the total toe angle present in the vehicle steering system. The remaining TOOT values are plotted against the toe angles for one steered wheel of the vehicle, and a trend line of the TOOT values is then resolved to interpolate additional data points. Preferably the trend line of Equation 1 is used. With a trend line representing the TOOT steering effect, the amount of the TOOT effect in a given steered wheel can be identified from the plot shown in FIG. 14 for any steering-angle of the opposite steered wheel.

Using the identified TOOT effect for a steered vehicle wheel, adjustments to the toe angle of a steered vehicle wheel may be carried out with the wheel steered to a convenient adjustment position. During a toe angle adjustment procedure, the steered wheel is initially steered straight ahead preferably relative to the thrust line of the vehicle, and the steering wheel disposed in a level position. The toe angle of the first steered wheel (left for this description) is measured, and a specification value for the toe angle is subtracted from the measured value. The result is stored as a first toe angle comparison value. The toe angle of the second steered wheel is adjusted until the total toe of the first and second wheel minus a specification for total toe for the wheels equals the first toe angle comparison value, which, as described in U.S. Pat. No. 5,553,389 to Winslow et al. may be represented in equation form as:

$$TT_{Measured} - TT_{Specification} = FWT_{StoredMeasured} - FWT_{Specification} \quad \text{Eqn. (33)}$$

where $TT_{Measured}$ equals measured total toe for the two wheels, $TT_{Specification}$ equals the specification value for total toe, $FWT_{StoredMeasured}$ equals the measured first steered wheel toe which is stored, and $FWT_{Specification}$ equals the specification value for the first steered wheel toe. The alignment technician would adjust the toe of the second steered wheel but it would be the difference between measured total toe and the total toe specification represented in equation form as:

$$TT_{Measured} - TT_{Specification} = T_{Adjustment} \quad \text{Eqn. (34)}$$

Total toe value changes as the wheels are steered from the preferred position because of TOOT. During adjustment of the toe for the wheel, the alignment technician may optionally steer the wheels to access any suspension components or adjustment points required to affect a required change in the toe angle of the steered wheel. A preferred way to accomplish this is to account for TOOT in Equations 33 and 34. During the optional steering, the observed toe angle of the wheel is compensated by the TOOT amount for that wheel represented in the modified Equation (33) form as:

$$TT_{Measured} - TT_{Specification} - TOOT_{TrendLine} = FWT_{StoredMeasured} - FWT_{Specification} \quad \text{Eqn. (35)}$$

where $TOOT_{TrendLine}$ is the TOOT trend line output value for the measured value of the steered wheel. Because of the TOOT compensation, the toe angle displayed by the alignment system does not change due to steering unless an actual adjustment is made to the toe angle. Upon completion of the adjustment to the first wheel, the toe angle of a second steered wheel is adjusted. Instead of showing the alignment technician a measured toe angle of the second steered wheel minus the specification value of the toe angle for the second steered wheel, the total toe minus the total toe specification is used while adjusting the toe for the second steered wheel until the result is substantially zero. To compensate the adjustment for steering the wheels from the preferred location, a TOOT trend line output value is used. This adjustment to the second steered wheel while compensating for steering can be represented as:

$$TT_{Measured} - TT_{Specification} - TOOT_{TrendLine} = 0 \quad \text{Eqn. (36)}$$

Finally, the wheels are steered to a preferred position such as vehicle straight ahead relative to thrust line, at which point a verification is made that the steering wheel is level and the toe angles are within a predetermined tolerance of the specification values. The final step does not adjust the toe of the first wheel for TOOT.

The steered wheels of a vehicle are coupled to a steering wheel via a vehicle steering system, which can be either a fixed ratio steering system, or a variable ratio steering system. A variety of steering systems are commonly utilized in vehicles, including mechanical steering systems, hydraulic steering systems, electro-mechanical steering systems, steer-by-wire systems, and combinations thereof. Typically, steering systems are designed to operate with one or more predetermined steering ratios, i.e. when the vehicle steering wheel is turned a selected amount, the steered vehicle wheels turn in a proportional arc. However, as components age, wear, or fail, a degree of slack may develop in the steering system, or the system may fail to properly vary a steering ratio in response to predetermined vehicle operating conditions.

Accordingly, in an alternate method of the present invention, a method is provided for measuring the steering ratio of a vehicle steering system. The method is preferably utilized in combination with a vehicle wheel alignment system, such as shown in FIG. 18, as part of a vehicle wheel alignment procedure wherein suitable sensors are disposed to acquire alignment angle measurements of the steered wheels of a vehicle, and in particular, to acquire toe angle measurements of the steered wheels. However, those of ordinary skill in the art will recognize that this method of the present invention is not limited to use with a vehicle wheel alignment system, and may be utilized with a wide range of vehicle service system having sufficient sensor capacity and computational ability.

To obtain a measurement of a change in the rotational position of the vehicle steering wheel, an additional rotational position sensor is disposed in operative relationship to the vehicle steering wheel. The rotational position sensor is configured to provide a signal representative of either a current rotational position of the steering wheel, or a measurement of a change in rotational position of the steering wheel. Those of ordinary skill in the art will recognize that the rotational position sensor may be incorporated into the vehicle steering system if a suitable means is provided for communicating the required data to the vehicle wheel alignment system or service system, or may be a removable sensor temporarily secured to the vehicle steering wheel during the vehicle service procedure. Similarly, a removable sensor may be utilized in combination with an incorporated rotational position sensor to provide a redundant or comparison measurement of a steering wheel rotation position or change therein. One such rotational position sensor would be the CXTD02 Digital Tilt and Acceleration sensor from Crossbow Technology Incorporated. Combining the CXTD02 sensor with an RF radio supporting a standard protocol such as the IEEE 802.15.4 otherwise known as Zigbee or a non-standard protocol which would be customized for use in an alignment system could be used to provide the rotational position of the steering wheel.

To determine a current vehicle steering system steering ratio, a measurement of a change in the rotational position of the vehicle steering wheel is determined using signals from the rotational position sensor disposed in operative relationship to the vehicle steering wheel. An associated change in the steered angle of the steered vehicle wheel is determined from the sensors disposed to acquire alignment angle measurements of the steered wheels. A comparison of the steering wheel rotational position change and the change in the steered angle of the steered wheels identifies the current vehicle steering system ratio.

Alternatively the vehicle steering system may be controlled with an electronic signal from the alignment equipment to change the steering ratio. Some vehicles change the steering ratio based on the speed and direction of vehicle travel. The alignment system optionally triggers this change in steering ratio as required for measurement procedures by sending the appropriate signal to the vehicle steering system, such as through a suitable diagnostic communications access point.

The current vehicle steering system ratio is compared with one or more predetermined specification values to verify proper operation of the vehicle steering system components, particularly in vehicle steering systems having variable or user-selectable steering ratios. Deviations between the current vehicle steering system ratio and the predetermined specification values may be displayed to an operator, together with optional suggested repairs or service instructions for the vehicle steering system. Optional plots of the steering ratio such as toe versus steering wheel angle or steering ration versus a vehicle operating condition such as speed may be presented to an operator. Additional steering system measurements may be acquired utilizing the same components, such as steering wheel turns lock-to-lock, and an identification of a "true" steering system centered position, as the mid-point between the maximum clockwise and counter-clockwise steering wheel rotational positions, enabling an operator to adjust the mechanical couplings of the steering system to "level" the steering wheel as required.

Figure 17:
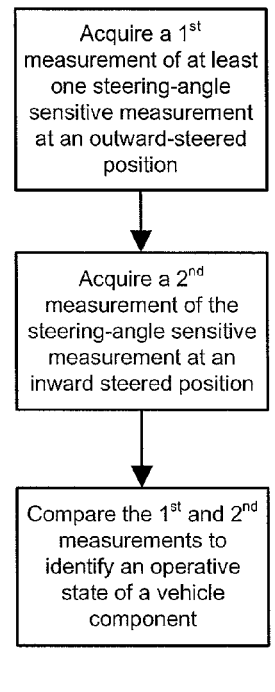
FIG. 17 is a flow chart illustrating steps in a second alternate method of the present invention.

Camber angle and live caster angle change in value as the vehicle wheels are steered through an arc, as previously discussed. Loose components in the steering and suspension system can have an adverse affect on the alignment angle data collected to resolve the previously discussed trend lines. For example, there are instances in the field where a mechanic does not put the vehicle wheel on the wheel hub correctly. Everything seems fine until the vehicle driver steps on the brake and there is no stopping force. There is no stopping force because the wheel is actually moving due to the force of the brake calipers. Since the wheel moves there is no opposing force to the brake calipers and there is no brake force. As shown in FIG. 17, this kind of problem could be found with a hysteresis measurement. Accordingly, in an alternate method of the present invention, a method is provided for measuring the hysteresis in camber angle and live caster angle.

To obtain a measure of hysteresis, a vehicle wheel is steered from a left turn angle (toe angle) to a selected location such as 0° turn angle (toe angle) where a measure of the camber angle $C_{Left}$ and the live caster angle $K_{LiveLeft}$ is taken and from a right turn angle (toe angle) to 0° turn angle (toe angle) where another measure of the camber angle $C_{Right}$ and the live caster angle $K_{LiveRight}$ is taken. The difference between $C_{Left}$ and $C_{Right}$ is the camber hysteresis measurement and is compared to a predetermined camber hysteresis threshold. This predetermined threshold may be a predetermined value, downloaded from a database to apply to all vehicles, a vehicle specific value obtained from a specification database, or entered manually. If the camber hysteresis measurement is greater than the predetermined camber hysteresis threshold then the alignment system can present the information in preferably a visual display showing the steering and suspension components that may be a problem. Likewise, the difference between $K_{LiveLeft}$ and $K_{LiveRight}$ is the live caster hysteresis measurement and is compared to a predetermined live caster hysteresis threshold. If the live caster hysteresis measurement is greater than the predetermined live caster hysteresis threshold then the alignment system can present the information in preferably a visual display showing the steering and suspension components that may be a problem.

A preferred apparatus to improve the hysteresis measurement is a turn plate that is controlled in such a way as to apply force at the bottom of the vehicle wheel in the positive and negative x-direction (left and right of a lift rack runway) or in the positive and negative y-direction (parallel to a lift rack runway) when commanded by an alignment system. The improved turn plate apparatus is combined with the steering procedure used to measure camber angle and live caster angle hysteresis. When the $C_{Left}$ measurement is taken, the turn plate is preferably commanded to apply a force in the x-direction opposite the direction the vehicle wheel is being steered. When the $K_{LiveLeft}$ measurement is taken, the turn plate is commanded to apply a force in the positive or negative y-direction. When the $C_{Right}$ measurement is taken, the turn plate is preferably commanded to apply a force in the x-direction opposite the direction the vehicle wheel is being steered. When the $K_{LiveRight}$ measurement is taken, the turn plate is commanded to apply a force in the opposite direction of the force applied when the $K_{LiveLeft}$ measurement was taken. Using the improved turn plate apparatus in this way will help insure any looseness in parts is consistently measured.

In an alternate method of the present invention for calculating the setback alignment distance of a steered vehicle wheel for a given steering-angle (toe angle), an initial set of wheel alignment angle and distance measurements are acquired for the steered vehicle wheel. The measurements are preferably acquired during a caster steer alignment procedure. The initial set of wheel alignment angle and distance measurements includes at least one measure of setback alignment distance at a predetermined steering-angle for the setback alignment distance such as steer-ahead relative to geometric centerline, and a sufficient number of measurements of setback alignment distance at different steering-angles to resolve a trend line calculation representative of the setback alignment distance over a range of steering-angles. Using the acquired initial measurements, the setback alignment distance is calculated by the wheel alignment system for any given steering-angle of the steered vehicle wheel using the resolved trend line equation, and a comparison can be made with the value of setback alignment distance at the predetermined steering-angle. Optionally the alignment system can display the setback alignment distance as a plot over a range of steering angles using the resolved trend line algorithm. Those in the art will recognize that setback can also be calculated as an angle and displayed as such.

In an alternate method of the present invention for calculating the wheelbase alignment distance of a steered vehicle wheel for a given steering-angle (toe angle), an initial set of wheel alignment angle and distance measurements are acquired for the steered vehicle wheel. The measurements are preferably acquired during a caster steer alignment procedure. The initial set of wheel alignment angle and distance measurements includes at least one measure of wheelbase alignment distance for a vehicle side at a predetermined steering-angle for the wheelbase alignment distance such as steer-ahead relative to geometric centerline, and a sufficient number of measurements of wheelbase alignment distance at different steering-angles to resolve a trend line calculation representative of the wheelbase alignment distance over a range of steering-angles. Using the acquired initial measurements, the wheelbase alignment distance is calculated by the wheel alignment system for any given steering-angle of the steered vehicle wheel using the resolved trend line equation, and a comparison can be made with the value of wheelbase alignment distance at the predetermined steering-angle. Optionally the alignment system can display the wheelbase alignment distance as a plot over a range of steering angles using the resolved trend line algorithm. Those in the art will recognize that wheelbase can also be calculated as an angle and displayed as such.

In an alternate method of the present invention for resolving a trend line equation of wheelbase alignment distance over a range of steering angles, the plots of wheelbase for both sides of a vehicle can be made to cross such as by referencing both left and right wheelbase measurements to either the left or right wheel's toe angle. Compensations for the wheelbase and toe relationship can optionally be made for total toe, TOOT, and thrust angle. For example, as the vehicle is steered to the left, the left wheelbase distance will typically lower in value and the right wheelbase distance will increase in value. As the vehicle is steered to the right, the opposite happens, the left wheelbase distance will typically increase in value and the right wheelbase distance will lower in value. Using the trend line calculations for both the left and right wheels, the exact steering angle where the wheelbase measurements cross can be calculated. Optionally the crossing location can be displayed to the operator.

In an alternate method of the present invention for calculating the change in ride height of a steered vehicle wheel for a given steering-angle (toe angle), an initial set of wheel alignment angle and ride height distance measurements are acquired for the steered vehicle wheel. The measurements are preferably acquired during a caster steer alignment procedure. The initial set of wheel alignment angle and ride height distance measurements include at least one measure of ride height alignment distance at a predetermined steering-angle, such as steer-ahead relative to geometric centerline, and a sufficient number of measurements of ride height alignment distances at different steering-angles to resolve a trend line calculation representative of the ride height alignment distance over a range of steering-angles. Using the acquired initial measurements, the ride height alignment distance is calculated by the wheel alignment system for any given steering-angle of the steered vehicle wheel using the resolved trend line equation, and a comparison can be made with the value of ride height alignment distance at the predetermined steering-angle. Optionally the alignment system can display the ride height alignment distance as a plot over a range of steering angles using the resolved trend line algorithm.

In an alternate method of the present invention for resolving a trend line equation of ride height alignment distance over a range of steering angles, the plot of ride height for both the left and right wheels can be made to cross such as by referencing both ride height measurements to either the left or right wheel's toe angle. Compensations for the ride height and toe relationship can optionally be made for total toe, TOOT, and thrust angle. For example, as the vehicle is steered to the left, the left ride height alignment distance will typically lower in value and the right wheel ride height alignment distance will increase in value, inducing a "body roll". As the vehicle is steered to the right, the opposite happens, the left ride height alignment distance will typically increase in value and the right ride height alignment distance will lower in value. Using the trend line calculations for both the left and right wheels, the exact steering angle where the cross occurs can be calculated, identifying a point of neutral "body roll" where the vehicle ride height is equal when measured on opposite sides fo the vehicle. Optionally the crossing location can be displayed to the operator.

In an alternate method of the present invention for profiling the orientation change in a steering or suspension part as the vehicle is steered for a given steering-angle (toe angle), an initial set of wheel alignment angle and part orientation measurements are acquired for the steered vehicle wheel. The measurements are preferably acquired during a caster steer alignment procedure. The initial set of wheel alignment angle and part orientation measurements include at least one measure of a part orientation at a selected steering-angle such as steer-ahead relative to geometric centerline or steer-ahead relative to thrust line, and a sufficient number of measurements of the part orientation at different steering-angles to resolve a trend line calculation representative of the part location over a range of steering-angles. Using the initial measurements a plot of the orientation versus the toe angle can be made. The plot of part orientation versus steer angle can optionally be displayed to the operator using the resolved trend line algorithm. The part profile can be used to detect a potentially bad part by observing a discontinuity in the data collected relative to the toe angle. The part profile can be compared to a reference part profile to verify correctness. The part profile of a particular part or set of parts such as tie rods can be used to detect a vehicle handling condition or problem such as bump steer condition.

A preferred apparatus to measure a part orientation is the use an optical target with known, identifiable objects attached to the part and within the field of view of an associated imaging system. The images of the optical target are processed while the vehicle is steered, resulting in a three-dimensional representation of the target in space that changes relative to toe. Alternatively, an active measurement device may be attached to the part or parts under observation. For example, the measurement device may include an RF radio supporting a standard protocol such as the IEEE 802.15.4 otherwise known as Zigbee or a non-standard protocol which would be customized for use in an alignment system could be used along with an inclinometer. The inclinometer measurements could be communicated to the aligner using the RF radio. Using the above calculated crossing angle, a new centerline for the vehicle can be calculated using the bisector of the rear track width along the axle.

For example, if a trend line algorithm is calculated for camber angle versus toe, an alignment display can present a graph of camber and toe. A range of camber angles may be displayed on the vertical axis and an associated range of toe angles may be displayed on the horizontal axis. The measured data may be displayed on the graph together with the data represented by the trend line algorithm. An interactive location marker may display the measured data, the trend line data, the coefficient of determination, the total number of measured data points, a rate of steering, or the difference between a measured data value and the trend line value. Similarly, a live location marker may be utilized to display any of the interactive location marker items together with the live camber and toe readings at the current vehicle steered location.

Those of ordinary skill in the art will recognize that measured data representative of the various steering-angle compensated alignment angles, distance measurements, and part orientations described herein may be displayed to an operator visually, such as in the form of a bar graph.

Those of ordinary skill in the art will recognize that the data required by two or more methods of the present invention may be acquired during a single steer procedure, eliminating the need to repeated steer the vehicle wheels about a steering arc.

Those of ordinary skill in the art will recognize that the various methods and visual displays illustrated here are not limiting, and that a variety of methods and/or different visual displays may be utilized to direct the operator through a steering adjusted alignment angle or distance. Similarly, other alignment angles such as caster trail and scrub radius, not specifically described herein, may be compensated in a similar fashion for steering angle variations.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for utilizing a determined relationship between a steering-angle sensitive vehicle measurement and a steering angle of a steered vehicle wheel during a vehicle wheel alignment procedure, comprising:

acquiring a first set of vehicle measurements, said first set of vehicle measurements including at least one measure of a steering-angle sensitive vehicle measurement at a first steering-angle of the steered vehicle wheel;

acquiring a second set of vehicle measurements, said second set of vehicle measurements including at least one measure of said steering-angle sensitive vehicle measurement at a second steering-angle of the steered vehicle wheel;

determining a relationship between the steering-angle of the steered vehicle wheel and said steering-angle sensitive vehicle measurement by utilizing said first and second sets of vehicle measurements;

generating a current representation of said steering-angle sensitive vehicle measurement for a preferred steering-angle responsive to a current steering-angle of the steered vehicle wheel and said determined relationship, wherein said preferred steering-angle is different from said current steering-angle; and adjusting a vehicle component utilizing said generated current representation, said adjustment altering a vehicle wheel alignment parameter.

2. The method of claim 1 wherein said steering-angle sensitive vehicle measurement is a vehicle wheel alignment distance measurement.

3. The method of claim 1 wherein said steering-angle sensitive vehicle measurement is a vehicle wheel alignment angle.

4. The method of claim 1 wherein said first steering angle of said steered vehicle wheel is selected from a set of angles including a 0° toe angle, an angle aligned parallel with a vehicle thrust line, and an angle aligned parallel with a vehicle center line.

5. The method of claim 1 wherein said steering-angle sensitive vehicle measurement is a camber alignment angle.

6. The method of claim 1 wherein said steering-angle sensitive vehicle measurement is a live caster alignment angle.

7. The method of claim 1 wherein said step of determining said relationship includes resolving a trend line calculation representative of a relationship between said steering-angle sensitive vehicle measurement and said steering angle of said steered vehicle wheel, utilizing said acquired set of vehicle measurements.

8. The method of claim 7 wherein said trend line calculation is an $n^{th}$ order polynomial equation of the type $Y=C_1+C_2X+C_nX^{n-1}$, where X represents the steering-angle of said steered vehicle wheel, Y represents the steering-angle sensitive vehicle measurement, and $C_n$ represents a constant.

9. A method for representing a steering-angle sensitive vehicle measurement to facilitate altering a vehicle wheel alignment parameter during a vehicle wheel alignment procedure, comprising:
  acquiring a set of vehicle measurements, said set of vehicle measurements including at least one measure of a steering-angle sensitive vehicle measurement at a first steering-angle of a steered vehicle wheel, and at least one measure of said steering-angle sensitive vehicle measurement at a second steering-angle different from said first steering-angle;
  calculating, from said set of vehicle measurements, an amount of change in said steering-angle sensitive vehicle measurement associated with said change from said first steering-angle to said second steering-angle; and
  utilizing said change in said steering-angle sensitive vehicle measurement and said at least one measure of said steering-angle sensitive vehicle measurement at said first steering-angle, to determine a relationship between said steering-angle and said steering-angle sensitive vehicle measurement; and
  conducting at least a portion of a vehicle wheel alignment procedure at a current steering-angle of the vehicle wheel, utilizing a representation of said steering-angle sensitive vehicle measurement for a preferred steering angle, said representation generated from said current steering-angle and a current measurement of said steering-angle sensitive vehicle wheel measurement, together with said determined relationship.

10. A method for determining steering-angle deviations for a steering-sensitive alignment angle associated with a current steering-angle of a vehicle wheel during a vehicle wheel alignment procedure, comprising:
  acquiring a set of alignment angle measurements for the steered vehicle wheel, said set of alignment angle measurements including at least one measure of the steering-sensitive alignment angle at a first steering-angle of the steered vehicle wheel, and at least one measure of the steering-sensitive alignment angle at a second steering-angle of the steered vehicle wheel which is different from said first steering-angle;
  calculating, from said set of alignment angle measurements, a relationship between said steering-sensitive alignment angle and the steering-angle of the steered vehicle wheel; and
  conducting at least a portion of a vehicle wheel alignment procedure at a current steering-angle of the vehicle wheel utilizing a representation of the steering-sensitive alignment angle for a preferred steering-angle, said representation determined from the preferred steering-angle, the current steering-angle of the vehicle wheel, a current measurement of the steering-sensitive alignment angle, and a deviation of the steering-sensitive alignment angle which is associated with the current steering-angle and which is obtained from said calculated relationship between said steering-sensitive alignment angle and the steering-angle of the steered vehicle wheel.

11. A vehicle wheel alignment system for directing the adjustment of a vehicle component, comprising:
  at least one sensor configured to acquire a set of vehicle measurements, said set of vehicle measurements including at least one measure of a steering-angle sensitive vehicle parameter at a first steering-angle of a steered vehicle wheel;
  a processing unit operatively coupled to said at least one sensor, said processing unit configured with program code to determine a relationship between said steering-angle sensitive vehicle parameter at a preferred steering-angle and said at least one measure of the steering-angle sensitive vehicle parameter at the first steering-angle;
  wherein said processing unit is further configured with program code to generate a representation of said steering-angle sensitive vehicle parameter at said preferred steering-angle, based on said determined relationship, a current measure of said steering-angle sensitive vehicle parameter, and a current steering-angle of the steered vehicle wheel; and
  wherein said processing unit is further configured to utilize said representation of said steering-angle sensitive vehicle parameter at said preferred steering-angle to direct adjustments of a vehicle component.

12. A method for conducting at least a portion of a vehicle wheel alignment procedure using a steered vehicle wheel toe angle representation compensated for a toe-out-on-turns effect of vehicle steering and suspension geometry, comprising:
  acquiring an initial set of vehicle wheel alignment angle measurements for each steered vehicle wheel on a common axle as said steered vehicle wheels are steered;
  determining a toe angle relationship for each of said steered vehicle wheels from said initial set of vehicle wheel alignment angle measurements; and
  conducting at least a portion of a vehicle wheel alignment procedure at a current steering angle of one of said steered vehicle wheels, said procedure utilizing a compensated toe angle representation for the current steering angle determined from said current steering angle, said current toe angle measurement, and said toe angle relationship which accommodates the toe-out-on-turns steering-angle effects of the vehicle steering and suspension geometry at the current steering angle.

13. The method of claim 12 for compensating a steered vehicle wheel toe angle representation for a toe-out-on-turns effect of vehicle steering and suspension geometry associated with a pair of steered vehicle wheels, wherein said toe angle relationship is a toe angle trend line.

14. A method for conducting a vehicle wheel alignment procedure at a steering-angle of a steered vehicle wheel which differs from a preferred steering-angle using a determined relationship between a calculated steering-angle sensitive parameter of the steered vehicle wheel and a measured steering-angle sensitive parameter of the steered vehicle, comprising:

acquiring a first set of vehicle measurements, said first set of vehicle measurements including at least one measure of the measured steering-angle sensitive parameter at a first steering-angle of the steered vehicle wheel;

acquiring a second set of vehicle measurements, said second set of vehicle measurements including at least one measure of the measured steering-angle sensitive parameter at a second steering-angle of the steered vehicle wheel;

utilizing said first and second sets of vehicle measurements to determine a first relationship, said first relationship being between the steering-angle of the steered vehicle wheel and the measured steering-angle sensitive parameter;

determining a second relationship utilizing said first relationship, said second relationship being between the calculated steering-angle sensitive parameter and the steering-angle of the steered vehicle wheel; and conducting a vehicle wheel alignment procedure to adjust a vehicle component with the steered vehicle wheel at a steering-angle which differs from the preferred steering-angle, using a representation of the calculated steering-angle sensitive parameter for the preferred steering-angle of the vehicle wheel, said representation determined from said second relationship, a current measurement of said measured steering-angle sensitive vehicle parameter, and the current steering-angle of the vehicle wheel.

15. The method of claim 14 wherein said calculated steering-angle sensitive parameter is a calculated steering-axis inclination angle, and wherein said measured steering-angle sensitive vehicle parameter is a live caster angle.

16. The method of claim 14 wherein said calculated steering-angle sensitive parameter is a calculated caster angle, and wherein said measured steering-angle sensitive vehicle parameter is a camber angle.

\* \* \* \* \*